United States Patent [19]
Miyazaki et al.

[11] Patent Number: 5,875,986
[45] Date of Patent: Mar. 2, 1999

[54] FISHING REEL OF DOUBLE BEARING TYPE HAVING IMPROVED FISHLINE RELEASING CHARACTERISTIC

[75] Inventors: Takeo Miyazaki; Nobuyuki Yamaguchi, both of Tokyo, Japan

[73] Assignee: Daiwa Seiko, Inc., Tokyo, Japan

[21] Appl. No.: 525,155

[22] Filed: Sep. 8, 1995

[30] Foreign Application Priority Data

| Sep. 8, 1994 | [JP] | Japan | 6-011201 |
| Mar. 15, 1995 | [JP] | Japan | 7-055497 |
| May 11, 1995 | [JP] | Japan | 7-137222 |

[51] Int. Cl.$^6$ ........................ A01K 89/00
[52] U.S. Cl. .................. 242/261; 242/322
[58] Field of Search .............. 242/322, 259, 242/260, 261, 288, 289

[56] References Cited

U.S. PATENT DOCUMENTS

| 1,890,736 | 12/1932 | Lenz | 242/260 |
| 2,298,481 | 10/1942 | Hayes | 242/322 X |
| 2,336,981 | 12/1943 | Clickner | 242/322 X |
| 3,831,897 | 8/1974 | Miller et al. | 242/129 |
| 4,222,537 | 9/1980 | Noda | 242/261 X |
| 4,334,380 | 6/1982 | Daniels | 242/260 X |
| 5,123,609 | 6/1992 | Noda | 242/261 |
| 5,388,778 | 2/1995 | Morimoto | 242/261 |

FOREIGN PATENT DOCUMENTS

| 60-81776 | 6/1985 | Japan . |
| 2-36389 | 10/1990 | Japan . |
| 2-138562 | 11/1990 | Japan . |
| 3-79665 | 8/1991 | Japan . |

Primary Examiner—Donald P. Walsh
Assistant Examiner—Emmanuel M. Marcelo
Attorney, Agent, or Firm—Sughrue, Mion, Zinn, Macpeak & Seas, PLLC

[57] ABSTRACT

A fishing reel of the double bearing type is provided which enhances the ability of releasing a fishline. The fishing reel of the double bearing type includes a spool (5) rotatably supported on a reel body, and this spool includes a fishline-winding barrel portion (50), and a pair of flanges (51). D is not more than 50 mm, and (d/D) is 50~80% where D represents an outer diameter of the spool, and d represents a diameter of a bottom of the fishline-winding barrel portion of the spool.

37 Claims, 16 Drawing Sheets

FISHING REEL OF DOUBLE BEARING TYPE HAVING IMPROVED FISHLINE RELEASING CHARACTERISTIC

BACKGROUND OF THE INVENTION

This invention relates to a fishing reel of the double bearing type, and more particularly to a double bearing-type fishing reel designed to enhance the ability of letting out or releasing a fishline.

Typical reels of the double bearing type are disclosed, for instance, in Japanese Utility Model Examined Publication No. 2-36389 and Japanese Utility Model Unexamined Publication No. 3-79665, and each of these reels comprises a spool, which has a fishline wound thereon, and is rotatably mounted between opposite side plates of a reel body, and a clutch mechanism for switching the spool between a fishline-winding condition and a spool-free condition. By switching operation of this clutch mechanism, the fishline can be released from the spool, and the released fishline can be again wound up on the spool.

A fishline-winding barrel portion of the spool in these conventional double bearing-type reels is formed into a deep groove-configuration, so that the spool has a large line-winding capacity. That is, since the angler desires to use the fishline under a less curled condition, the spool is generally designated to have a relatively large winding capacity so that only a portion of the wound fishline occupying the large diameter winding area of the spool is used actually during fishing. For example, when the fishline to be used is 8~10 Lb line, a spool, having a line-winding capacity of 140~200 m is used.

However, the amount of the fishline, normally released, taking a safety margin into consideration, is usually 50~70 m although it may vary to be more or less depending on the fishing style. Therefore, more than a half of the fishline wound on the spool is not usually used, and hence always remains wound on the spool. Because of this remaining portion of the fishline, the overall weight of the spool is increased thereby increasing the moment of inertia. As a result, the fishline-releasing ability is adversely affected, and also a backlash phenomenon (in which the fishline becomes loosened because the speed of rotation of the spool becomes higher than the speed of release of the fishline) is liable to occur. And besides, since the amount of winding of the fishline is large, the turns of the wound fishline bite one another, so that the fishline can not be smoothly released from the spool. And further, when the spool is brought into a freely-rotatable condition by switching the clutch mechanism, the moment of inertia is further increased as a result of production of a rotation resistance, since an inner periphery of a pinion is disposed in contact with an outer periphery of a spool shaft, thus aggravating the above problems.

In the above-mentioned Japanese Utility Model Examined Publication No. 2-36389 and Japanese Utility Model Unexamined Publication No. 3-79665, in order to prevent the backlash phenomenon, a magnetic braking device or a centrifugal braking device is mounted on a spool rotation shaft. However, a strong braking action is necessary for preventing an excessive rotation of the spool, producing a large moment of inertia, and therefore magnets or centrifugal collars are increased in size and weight. This is not desirable.

Apart from the above prior art, Japanese Utility Model Unexamined Publication No. 60-81776 discloses a technique in which an economizer is fitted on a fishline-winding barrel portion of a spool so that the amount of winding of the fishline on the spool can be varied. However, since this separate member, i.e. the economizer, is mounted on the spool capable of rotating at high speed, a rotation balance is adversely affected during the release of the fishline, so that casting noises are liable to be produced. And besides, because of the provision of the separate member, the overall weight of the spool increases to produce a larger moment of inertia, which again reinforces the above-mentioned problems.

SUMMARY OF THE INVENTION

It is an objective of this invention to provide a fishing reel of the double bearing type which enhances the ability of releasing a fishline.

The above-noted and other objectives have been achieved by a fishing reel of the double bearing type of the invention wherein a spool, having a fishline-winding barrel portion and a pair of flanges, is rotatably mounted between opposite side plates of a reel body; and there is provided a clutch mechanism for switching the spool between a fishline-winding condition and a fishline-releasing condition. In the fishing reel, D is set not more than 50 mm, and (d/D) is set 50~80%, where D represents an outer diameter of the spool, and d represents a diameter of a bottom of the fishline-winding barrel portion of the spool.

In order to obtain better results in the present invention, it is preferred that D (which represents the outer diameter of the spool) be not more than 40 mm, and d (which represents the diameter of the bottom of the fishline-winding barrel portion of the spool) be 20~30 mm.

In the fishing reel of the double bearing type, the ratio (d/D) of the diameter (d) of the bottom of the fishline-winding barrel portion of the spool to the outer diameter (D) of the spool (which is defined by the outer diameter of the flanges) is larger than that in the conventional fishing reel of the double bearing type, so that the fishline-winding barrel portion has a shallow groove-configuration. The fishline is wound on this fishline-winding barrel portion of a shallow groove-shape, and that portion of the fishline which has not been actually used is eliminated, so that the spool having the fishline wound thereon is reduced in weight.

Because of the reduced weight of the spool having the fishline wound thereon, the moment of inertia is reduced, and therefore the size of the magnet of the magnetic braking device for preventing the backlash phenomenon due to the excessive rotation of the spool can be reduced, and also the number of the magnets can be reduced. Also, in the case of using the centrifugal braking device, the size of the braking collars can be reduced, and the number of the braking collars can be reduced. As a result, the overall weight of the reel can be reduced, and the fishing operability is enhanced, and also the cost can be reduced.

In case the pinion, used in the clutch mechanism for switching the spool between the fishline-winding condition and the fishline-releasing condition, is rotatable independently of the spool shaft, and is axially movable into and out of engagement with the engagement portion formed on one side of the spool shaft, in the clutch OFF-condition in which the fishline can be released, the pinion will not contact the spool shaft. Therefore, the spool shaft is not subjected to a rotational frictional force, and the spool can be rotated better, so that the fishline-releasing ability is further enhanced.

The present invention further provides a fishing reel of the double bearing type wherein a spool shaft, having a spool, is rotatably supported between opposite side plates of a reel body; and there is provided a clutch mechanism in which an engagement recess, formed in a pinion meshingly engaged with a drive gear rotated by operating a handle, is brought into and out of engagement with an engagement projection on the spool shaft, thereby switching the clutch mechanism between a winding condition and a spool-free condition. In the fishing reel, the spool shaft has an outwardly-extending end portion extending outwardly of a bearing disposed inside of the side plate close to the handle, and the engagement projection is formed on the outwardly-extending end portion; the pinion, having the engagement recess for engagement with the engagement projection, is supported by a support portion, mounted in the side plate of the reel body, for rotation and sliding movement.

With the above construction of the present invention, that portion of the pinion having the engagement recess is supported by the bearing, thereby maintaining the strength thereof, and the pinion is not fitted on the spool shaft, and the pinion is supported by the bearing and the support portion independently of the spool shaft. Therefore a friction resistance is not exerted, and the spool shaft and the pinion are smoothly rotated independently of each other in the spool-free condition. Therefore, the casting distance is increased, and the ability of spool-free rotation is enhanced, so that the fishline-releasing ability is enhanced.

One end of the spool shaft and one end of the pinion are supported by the respective bearings mounted respectively in the tubular portions formed integrally with each other, and therefore the degree of alignment is enhanced, and the clutch mechanism, constituted by the engagement projection of the spool shaft and the engagement recess in the pinion, can be smoothly engaged and disengaged, so that the clutch properly functions in a stable manner, and the precision of meshing between the pinion and the drive gear is enhanced, so that the rotation for winding purposes can be effected with a small force.

Therefore, advantageously, there is provided the double bearing-type fishing reel in which the strength, the clutch ON-OFF switching ability, and the ability of releasing the fishline in the OFF-state, which are indispensable to the clutch function, are all enhanced.

DETAILED DESCRIPTION OF THE PREFERRED EMBODIMENTS

Preferred embodiments of the present invention will now be described with reference to the accompanying drawings.

Figure 1:
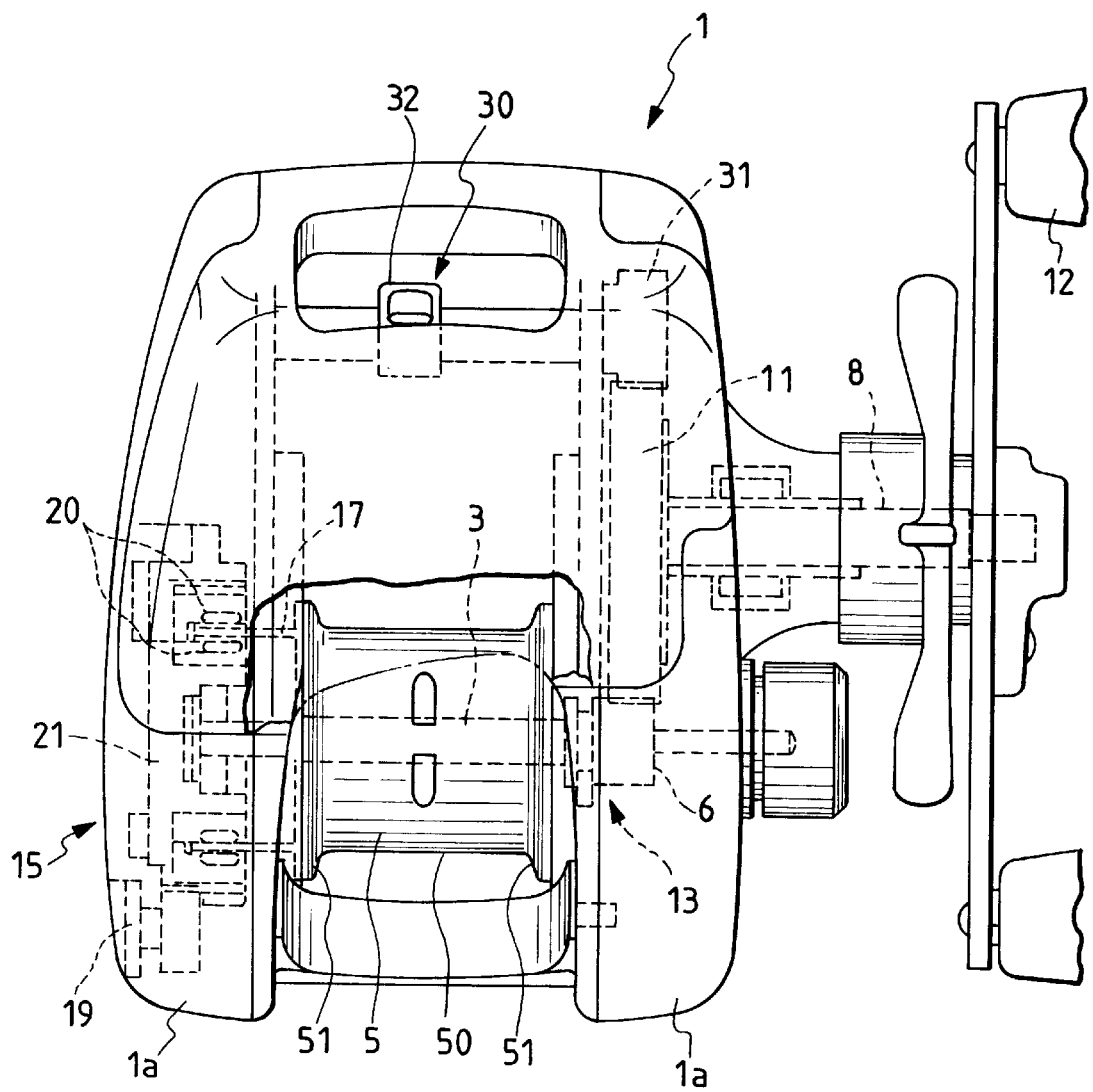
FIG. 1 is a view showing a general construction of a first embodiment of a double bearing-type fishing reel of the invention.

FIG. 1 is a view showing a general construction of a double bearing-type fishing reel of the invention. An overall construction of the double bearing-type fishing reel shown in FIG. 1 will now be described briefly.

A spool shaft 3 is supported by opposite side plates 1a of a reel body 1 through bearings disposed at its opposite ends thereof. A spool 5 for winding a fishline thereon is mounted integrally on the spool shaft 3. The opposite end portions of the spool shaft 3 extend respectively into the opposite side plates 1a, and a pinion 6 is mounted on one end portion of the spool shaft 3. A drive gear 11, mounted on one end of a handle shaft 8, is in mesh with the pinion 6. A handle 12 is mounted on the other end of the handle shaft 8. By rotating the handle 12, the spool 5 is rotated through the drive gear 11 and the pinion 6.

A clutch mechanism 13 is mounted on the spool shaft 3, and acts between the spool shaft 3 and the pinion 6 so that the spool 5 can be switched between a fishline-winding condition in which the spool can be rotated by manipulating the handle 12 and a fishline-releasing condition in which the spool is freely rotatable. This clutch mechanism 13 is driven or shifted between the ON-state and the OFF-state by a manipulation lever (not shown).

A braking device 15 is provided at the other end portion of the spool shaft 3 so as to prevent an excessive rotation of the spool 5. The illustrated braking device 15 is of the magnetic type, and comprises an electrically-conductive ring 17 rotatable with the spool 5, and a pair of magnets 20 provided respectively on opposite sides of a peripheral wall of the conductive ring 17 in such a manner that their north poles and south poles are opposed to each other. The pair of opposed magnets 20 are fixedly secured to a holder member 21 of a non-magnetic material, and are spaced a predetermined distance from each other, the holder member 21 being provided in the side plate 1a. With this construction, eddy currents are produced in the conductive ring 17 rotating in a magnetic field, and according to Fleming's left-hand rule, there is produced a braking force in a direction opposite to the direction of rotation of the conductive ring 17, thereby braking the spool 5. Therefore, even if the spool 5 is excessively rotated, the spool is braked by the braking device 15, thereby preventing backlash. The braking device 15 has a braking force-adjusting mechanism 19 which can adjust the braking force applied to the spool 5.

The fishline wound on the spool 5 is released therefrom and wound up thereon through a level wind device 30 provided parallel to the spool shaft 3. The level wind device 30 has a gear 31 in mesh with the drive gear 11, and a line guide portion 32 is slidingly moved right and left by rotating the handle 12 so that the fishline can be wound uniformly on the spool 5.

Figure 2:
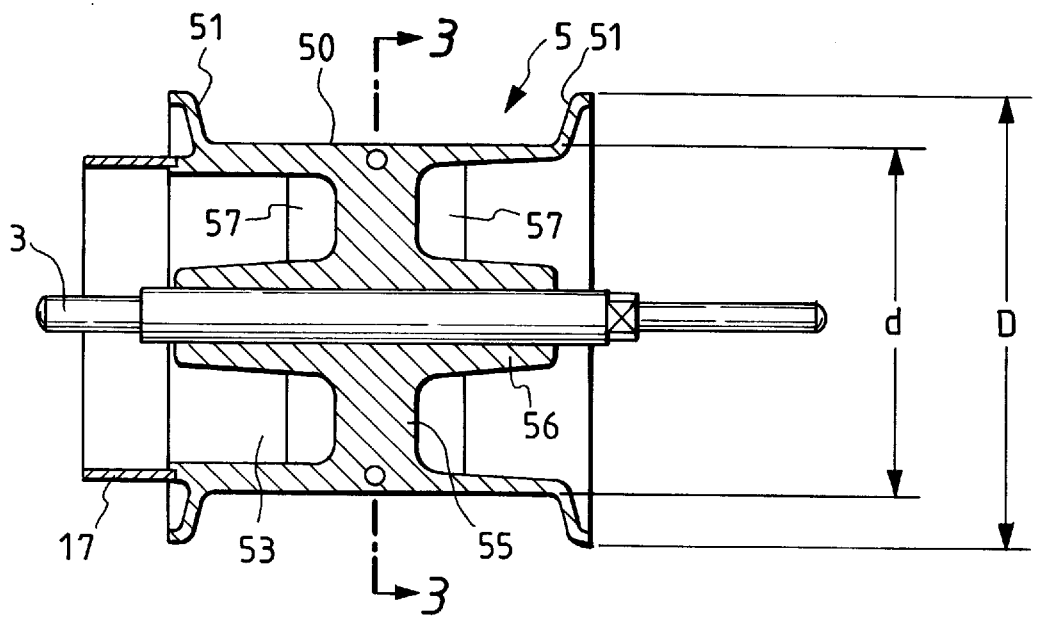
FIG. 2 is a horizontal cross-sectional view of a spool of the invention.
Figure 3:
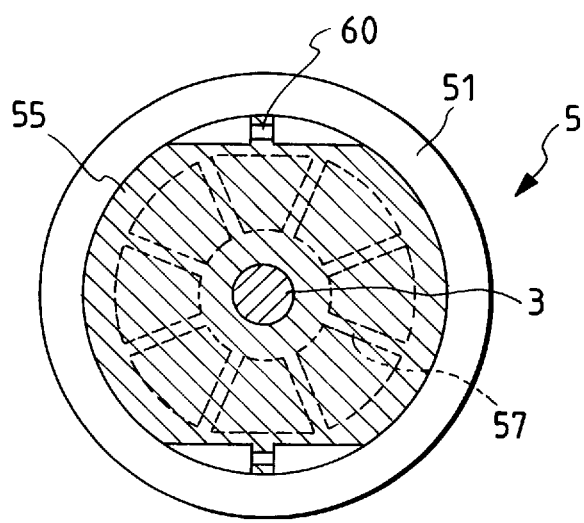
FIG. 3 is a cross-sectional view of the spool taken along the line 3—3 of FIG. 2.

The construction of the spool used in the double bearing-type reel shown in FIG. 1 will now be described. FIG. 2 is a horizontal cross-sectional view of one example of spool, and FIG. 3 is a cross-sectional view taken along the line 3—3 of FIG. 2.

The spool 5, mounted on the spool shaft 3, includes a fishline-winding barrel portion 50 for winding the fishline thereon, and a pair of flanges 51 for limiting the displacement of opposite ends of the wound fishline on the barrel portion 50. The fishline is uniformly wound by the level wind device 30 on a groove-like portion which is defined by the bottom of the fishline-winding barrel portion 50 and the two flanges 51 formed respectively at the opposite ends of the barrel portion 50.

Here, if the outer diameter of the spool (that is, the outer diameter of the flanges 51) is represented by D, and the diameter of the bottom of the fishline-winding barrel portion 50 is represented by d, the spool is so formed that D is not more than 50 mm and that (d/D) is 50~80%. Here, D is set to not more than 50 mm in view of casting, and (d/D) is set to 50~80% so as to satisfy the amount (for example, 50~70 m) of the fishline normally released in view of the safety in normal use. When D is not more than 50 mm, and (d/D) is 50~80%, the amount of winding of the fishline on the spool varies depending on the width of the spool in the direction of the axis thereof; however, the amount of the fishline normally released in view of the safety is satisfied. In view of the most commonly-used reel size, it is preferred that D be not more than 40 mm and that d be in the range of 20~30 mm.

In the thus designed spool, the amount of winding of the fishline is smaller as compared with the conventional spools, and that portion (dead portion) of the fishline, which has not heretofore been used, is eliminated from the spool of the invention, so that the weight of the spool can be reduced. In the illustrated embodiment, the spool 5 is further reduced in weight. More specifically, a deep recess or cavity 53 is formed in each of the opposite ends of the spool 5, and extends into the fishline-winding barrel portion 50 along the axis of the spool 5. The fishline-winding barrel portion 50 and a spool shaft-mounting portion 56 are interconnected by a disk-shaped connection portion 55 provided at a central portion of the barrel portion 50 in the axial direction. In this construction, the interior of the spool is generally hollow, so that the spool is reduced in weight. In the illustrated construction, although a predetermined number of ribs 57 are formed between the fishline-winding barrel portion 50 and the spool shaft-mounting portion 56 at each side of the disk-shaped connection portion 55, and are circumferentially spaced at equal intervals to thereby reinforce the spool, the provision of these ribs may be omitted. Reference numeral 60 denotes a hole through which the leading end of the fishline wound on the spool is passed to a line-holding member provided on the reel body.

Figure 4:
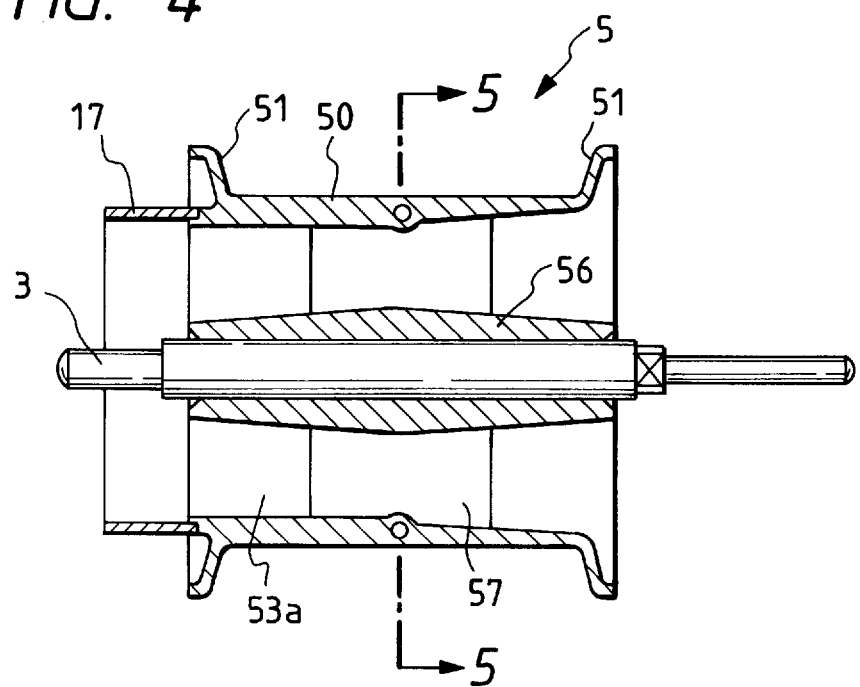
FIG. 4 is a horizontal cross-sectional view of a modified spool.
Figure 5:
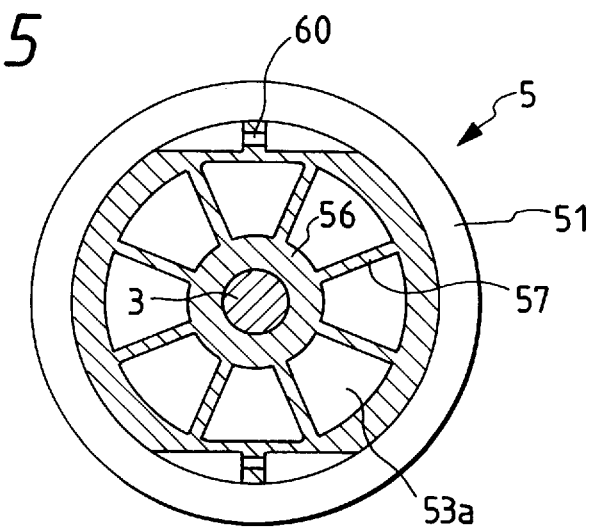
FIG. 5 is a cross-sectional view of the spool taken along the line 5—5 of FIG. 4.

FIG. 4 is a view showing a modification of the spool shown in FIG. 2, and FIG. 5 is a cross-sectional view of the spool taken along the line 5—5 of FIG. 4. These Figures show one modification of the spool in which the recess or cavity is formed in each of the opposite ends of the spool 5, and extends into the fishline-winding barrel portion along the axis of the spool, thereby achieving a lightweight design. In this modification, a cavity 53a is formed in a fishline-winding barrel portion 50 of a spool 5, and extends axially through the spool 5 from one end thereof to the other end. The fishline-winding barrel portion 50 and a spool shaft-mounting portion 56 are interconnected by a predetermined number of ribs 57 circumferentially spaced at equal intervals. With this construction, the weight of the spool 5 is further reduced. In the illustrated construction, although the fishline-winding barrel portion 50 and the spool shaft-mounting portion 56 are interconnected by the eight (8) ribs 57, the number of the ribs may be decreased in so far as the ribs are spaced at equal intervals. By thus reducing the number of the ribs 57, the weight of the spool can be further reduced.

Figure 6:
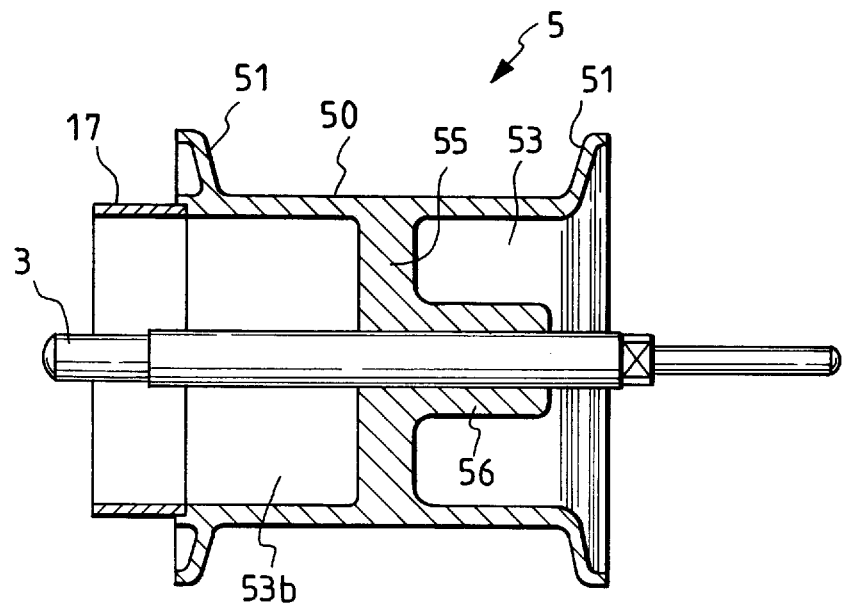
FIG. 6 is a horizontal cross-sectional view of another modified spool.

FIG. 6 is a view showing another modification of the spool shown in FIG. 2. In this modification, a cavity 53b is formed in one end of a spool 5, and extends axially toward a central portion of a fishline-winding barrel portion 50 to provide an entirely hollow construction at this side. A recess or cavity 53 is also formed in the other end of the spool 5, and extends axially toward the central portion of the fishline-winding portion 50, with a spool shaft-mounting portion 56 provided in this recess 53. With this construction, the spool is more lightweight than the spool of FIG. 2.

Figure 7:
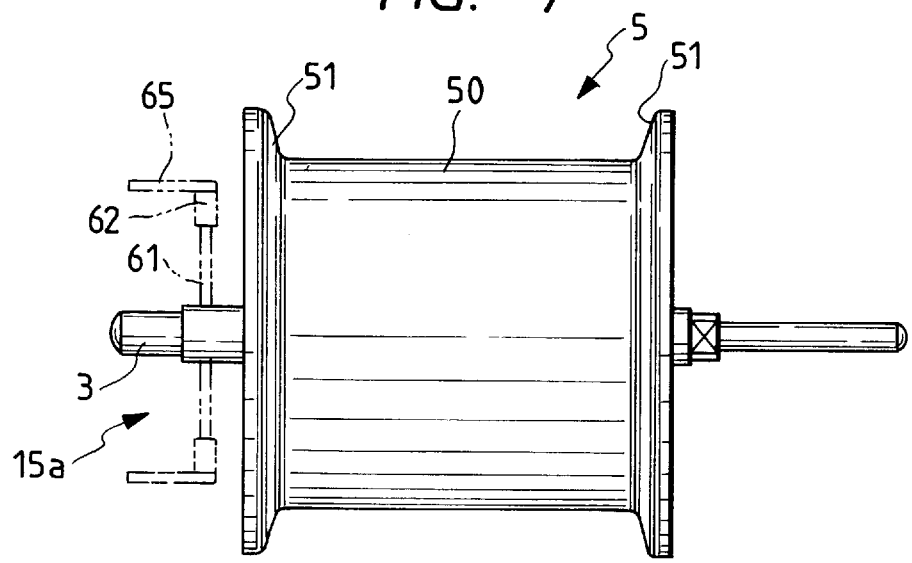
FIG. 7 is view showing a further modified spool provided with a different type of braking device.
Figure 8:
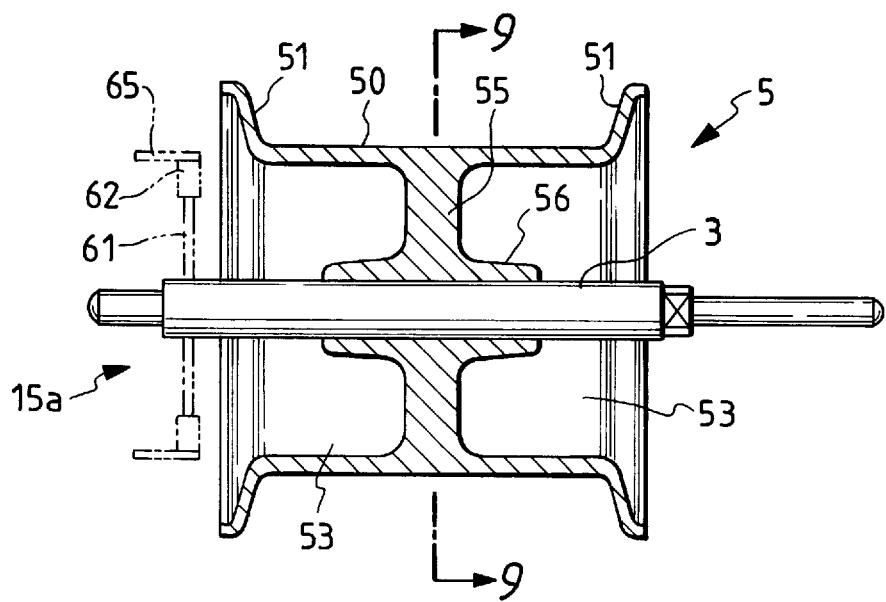
FIG. 8 is a horizontal cross-sectional view of the spool of FIG. 7.
Figure 9:
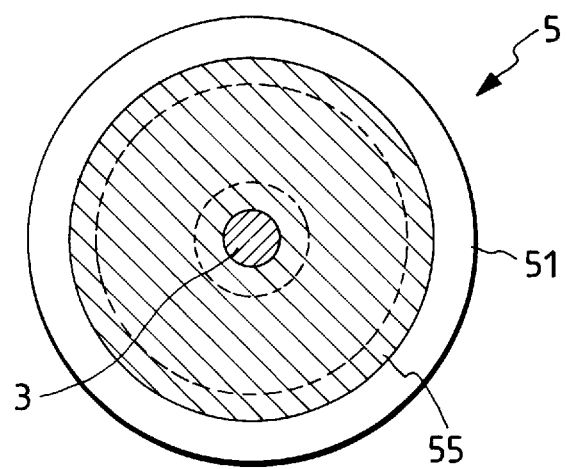
FIG. 9 is a cross-sectional view of the spool taken along the line 9—9 of FIG. 8.

FIGS. 7 to 9 show a further modified spool provided with a braking device different from the braking device of FIG. 1. FIG. 7 is a view showing an overall construction of the spool, FIG. 8 is a horizontal cross-sectional view of the spool, and FIG. 9 is a cross-sectional view taken along the line 9—9 of FIG. 8.

In this modification, the braking device 15a of the centrifugal type is employed, and this braking device comprises support shafts 61 each extending perpendicularly to a spool shaft 3, and a brake collar 62 mounted on each support shaft 61 for sliding movement therealong. Under the influence of a centrifugal force produced as a result of the rotation of the spool shaft 3, the brake collar 62 slidingly moves radially outwardly along the support shaft 62. A brake ring 65 is provided in a side plate of a reel body, and when the rotation of the spool shaft 3 becomes high, the brake collar 62 is brought into contact with the brake ring 65 to thereby brake the rotation of the spool shaft 3. In the present invention, instead of the brake device of the magnetic type shown in FIG. 1, such a brake device of the centrifugal type can be used. In this modified spool, also, a deep recess or cavity 53 is formed in each of the opposite ends of the spool, and extends axially toward a central portion of a fishline-winding barrel portion 50, thereby achieving a lightweight design.

Figure 10:
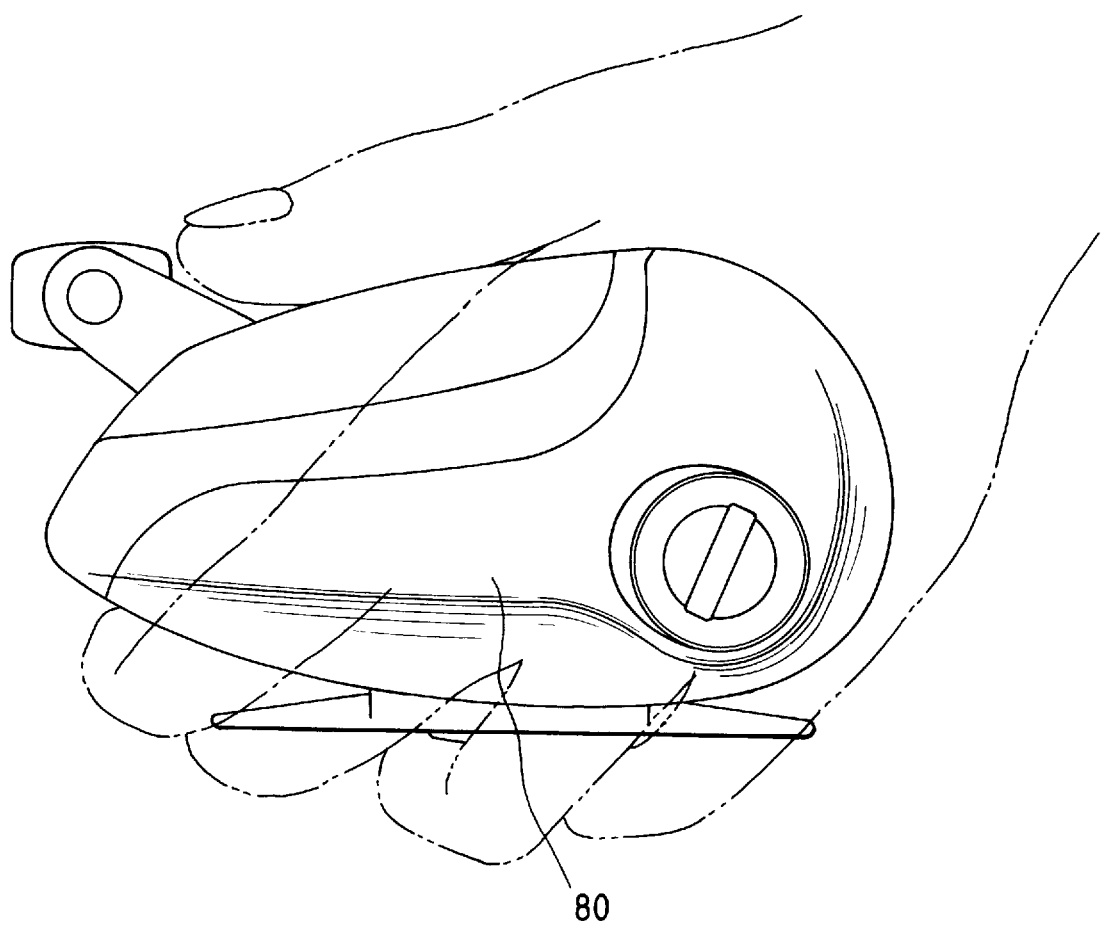
FIG. 10 is a view showing a condition in which the double bearing-type reel of the invention is actually grasped by the hand.

FIG. 10 shows a condition in which the double bearing-type reel of FIG. 1 is actually grasped by the hand. For example, a urethane coating, having elastic properties, can be applied to a grip portion 80 of the reel body, or a cork material can be fixedly secured to the grip portion 80, or a covering layer of a soft synthetic resin can be integrally connected to the grip portion 80 by insert-molding, an adhesive, or pins. By doing so, soft, anti-slip grip characteristics can be achieved.

The above embodiments of the present invention can achieve the following advantageous effects:

(1) Since unnecessary lower layers of the wound fishline are eliminated, the number of layers of the wound fishline is reduced, and therefore the wound condition of the fishline in the axial direction is good at its outer periphery, thereby achieving a good rotation balance of the spool. Therefore, noises (casting noises), which would be produced by the spool rotating at high speed when releasing the fishline, are prevented.

(2) Since the amount of winding of the fishline on the spool is smaller, the turns of the wound fishline are prevented from biting one another, and therefore the fishline can be smoothly released without any trouble, thus enabling a smooth casting operation.

(3) Since unnecessary lower layers of the wound fishline are eliminated, the overall amount of the fishline wound on the fishline-winding barrel portion of the spool is reduced, and therefore a force, with which the wound fishline is pressed against the spool flanges in the axial direction, is reduced. Therefore, the wall thickness of the spool can be reduced, and this achieves the lightweight design while maintaining the strength of the spool. With this lightweight design, the fishline-releasing ability is enhanced.

(4) The fishline-winding barrel portion is formed into a shallow groove-configuration, and the recess or cavity is formed in each end of the spool, and extends into the fishline-winding barrel portion. Therefore, unnecessary lower layers of the wound fishline are eliminated while securing the normally-required amount of winding of the fishline, and the weight of the spool itself can be reduced. Therefore, the overall weight of the spool actually used for fishing purposes is reduced, and the moment of inertia is reduced. As a result, the fishline-releasing ability is enhanced, and backlash due to the excessive rotation of the spool is prevented.

(5) Because of the reduced weight of the spool having the fishline wound thereon, the moment of inertia is reduced, and therefore the size of the magnets of the magnetic braking device for preventing the backlash phenomenon due to the excessive rotation of the spool can be reduced, and also the number of the magnets can be reduced. Also, in the case of using the centrifugal braking device, the size of the braking collars can be reduced, and the number of the braking collars can be reduced. As a result, the overall weight of the reel can be reduced, and the fishing operability is enhanced, and also the cost can be reduced.

The construction of the double bearing-type reel is not to be limited to the illustrated embodiments, and various modifications can be made. For example, the double bearing-type reel of FIG. 1 is given merely as one example, and the spools shown in FIGS. 2 to 9 can be applied to various kinds of double bearing-type reels. The braking devices are not limited to the illustrated constructions, and any other suitable magnetic or centrifugal braking device can be used. Furthermore, the clutch mechanism, as well as the hollow construction of the spool, can be modified in various ways.

Figure 11:
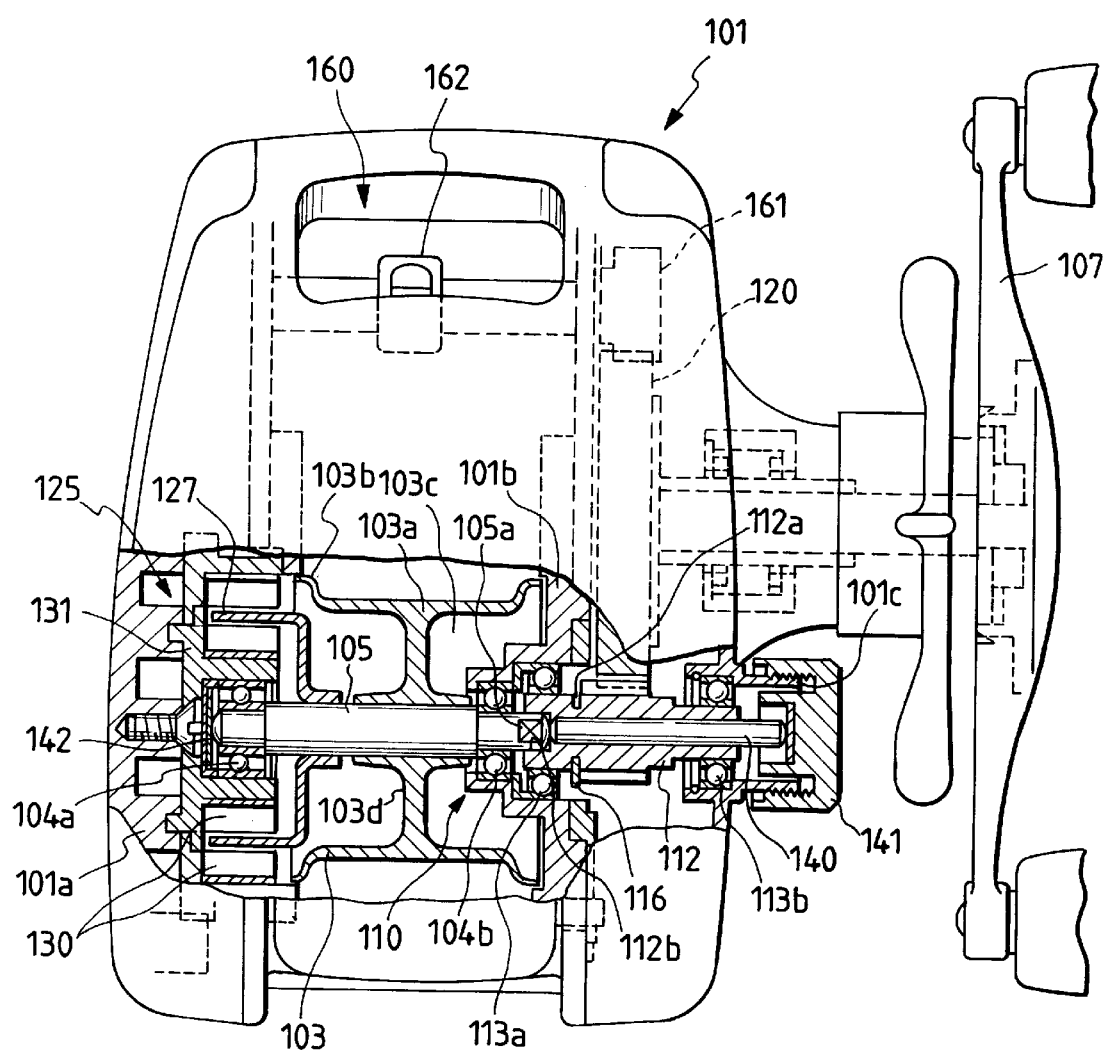
FIG. 11 is a view showing a general construction of a second embodiment of a double bearing-type fishing reel of the invention.
Figure 12:
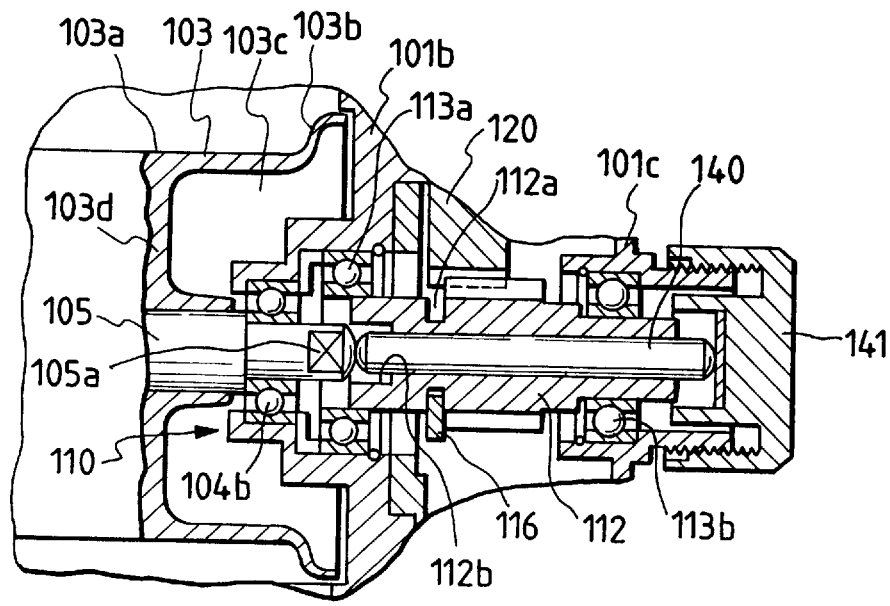
FIG. 12 is an enlarged, cross-sectional view showing a clutch mechanism mounted on one end of a spool shaft in FIG. 11.

FIG. 11 is a view showing a general construction of a double bearing-type fishing reel equipped with a featured clutch mechanism according to the invention, and FIG. 12 is an enlarged, cross-sectional view showing the clutch mechanism.

As similarly to the first embodiment, a spool 103 for winding a fishline thereon is mounted between opposite (left and right) frames 101a and 101b of a reel body 101. This spool 103 is mounted integrally on the spool shaft 105 rotatably supported by bearings 104a and 104b mounted respectively on the left and right frames 101a and 101b. The clutch mechanism 110 is mounted on one end of the spool shaft 105, and the clutch mechanism 110 can be driven or shifted between the ON-state (in which by rotating a handle 107, a drive force of this handle is transmitted to the spool shaft 105) and the OFF-state in which the transmission of the drive force to the spool shaft 105 is interrupted).

The clutch mechanism 110 includes an engagement portion 105a of a non-circular cross-section formed at one side of the spool shaft 105, and a pinion 112 movable into and out of engagement with the engagement portion 105a. The pinion 112 is rotatable independently of the spool shaft 105, and is axially movable into and out of engagement with the engagement portion 105a. More specifically, the pinion 112 extends in the axial direction, and is supported at its opposite ends by bearings (support members) 113a and 113b mounted on the frame 101b. A circumferential groove 112a is formed in the outer peripheral surface of the pinion 112, and a recess 112b for fitting on the engagement portion 105a of the spool shaft 105 is formed in one end face of the pinion 112. A clutch plate 116 is fitted in the circumferential groove 112a, and the clutch plate 116 is moved in the axial direction by a manipulation lever (not shown) so that the pinion 112 can be brought into and out of engagement with the engagement portion 105a.

A drive gear 120, mounted on one end of a handle shaft 108, is in mesh with the pinion 112, and in the clutch ON-state (in which the pinion 112 is engaged with the engagement portion 105a) shown in FIG. 11, when the handle 107 is rotated, the spool 103 is rotated through the drive gear 120 and the pinion 112. When the clutch plate 116 is driven by the manipulating lever (not shown) to shift the clutch into the OFF-state (FIG. 12) in which the pinion 112 is disengaged from the engagement portion 105a, the spool 103 becomes freely rotatable, thus achieving a fishline-releasing condition. In this case, the pinion 112 becomes independent of the spool shaft 105 (the pinion is not in contact with the spool shaft 105), and the spool 3 is in the fishline-releasing condition, so that even when the spool shaft 105 is rotated, no load is applied to the spool shaft 105.

A backlash prevention device 125 is provided at the other end of the spool shaft 105, and this backlash prevention device 125 serves to prevent an excessive rotation of the spool 103 so as to prevent backlash from developing when releasing the fishline. The backlash prevention device shown in FIG. 11 is of the magnetic type, and comprises an electrically-conductive ring 127 mounted on the spool shaft 105 for rotation with the spool 103, and a pair of magnets 130 provided respectively on opposite sides of a peripheral wall of the conductive ring 127 in such a manner that their north poles and south poles are opposed to each other. The pair of opposed magnets 120 are fixedly secured to a holder member 131 of a non-magnetic material, and are spaced a predetermined distance from each other, the holder member 131 being provided in the frame 101a. With this construction, eddy currents are produced in the conductive ring 127 rotating in a magnetic field, and according to Fleming's left-hand rule, there is produced a braking force in a direction opposite to the direction of rotation of the conductive ring 127, thereby braking the spool shaft 105 and hence the spool 103. Therefore, even if the spool 103 is excessively rotated, the spool is braked, thereby preventing backlash. The conductive ring 127 may be mounted on the end face of the spool 103.

Figure 13:
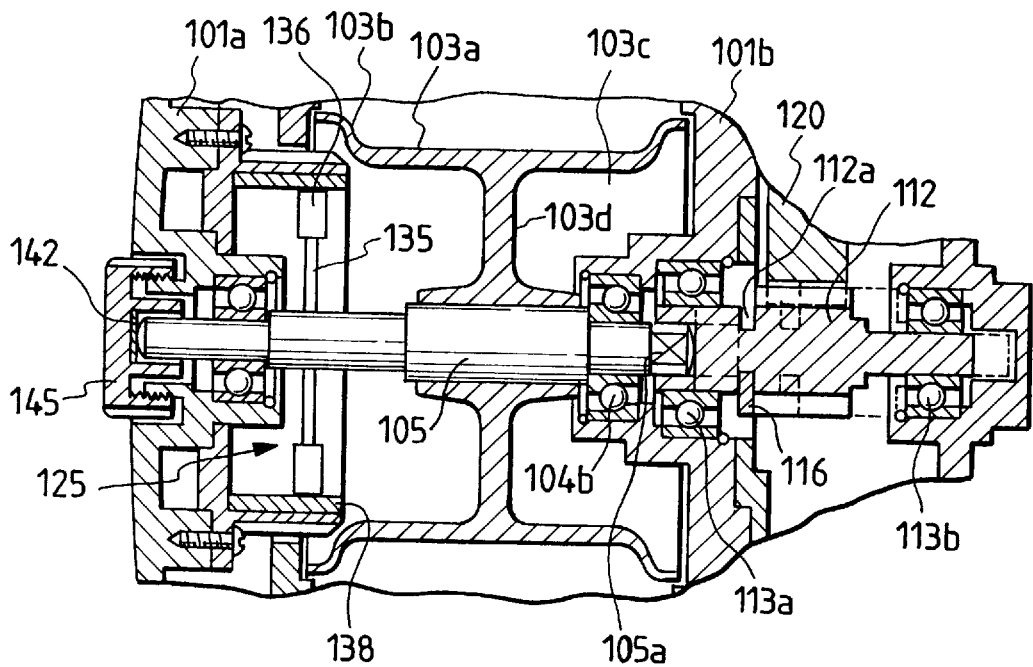
FIG. 13 is a cross-sectional view showing a modified braking device.

The backlash prevention device may be of the type operable by a centrifugal force, as shown in FIG. 13. The backlash prevention device shown in FIG. 13 comprises support shafts 135 extending perpendicularly to the spool shaft 105, and a brake collar 136 mounted on each support shaft 135 for sliding movement therealong. When the spool 103 and hence the spool shaft 105 rotate excessively, the brake collar 136 slidingly moves radially outwardly into contact with an inner peripheral surface of a brake ring 138, thereby braking the spool shaft 105. Therefore, even when the spool 103 is excessively rotated, the spool is braked, thereby preventing the backlash.

In addition to the above magnetic and centrifugal backlash prevention devices, there may be used a braking device of the type which applies a frictional force to the end face of the spool shaft 105. This braking device is so constructed as to manually adjust the rotational force of the spool 103, and with this braking device, backlash during the release of the fishline can be prevented. More specifically, as shown in FIG. 12, a hole is formed axially through the pinion 112, and a shaft 140 is mounted in this hole in coaxial relation to the spool shaft 105. A front end face of the shaft 140 is abutted against that end face of the spool shaft 105 adjacent to which the engagement portion 105a is formed, and a rear end face of the shaft 140 is abutted against an inner surface of a press-contact adjustment thumbscrew 141 threaded on a projected portion 101c formed on the reel body 101. By adjusting this press-contact adjustment thumbscrew 141, the shaft 140 is pressed against the spool shaft 105, so that the front end face of the spool shaft 105 is pressed against a friction plate 142 formed on the inner surface of the holder member 131, thereby adjusting the rotational force of the spool 103. With this construction, the pinion 112 can be rotatably supported more stably by the shaft 140. A gap may be formed between the inner peripheral surface of the pinion 112 and the outer peripheral surface of the shaft 140.

The braking device may be of such a type as to act on the spool shaft 105 from the left frame side, as shown in FIG. 13. More specifically, a press-contact adjustment thumbscrew 145 is threadedly mounted on the left frame of the reel body 101, and this thumbscrew 145 is threaded to apply a frictional force to the front end face of the spool shaft 105. Therefore, in the construction shown in FIG. 13, a pinion 112 is of a solid construction (not hollow), and is extended in the axial direction. The pinion 112 is supported at its opposite ends by bearings 113a and 113b, mounted on a frame 101b, for rotation independently of the spool shaft 105 and also for axial movement into and out of engagement with the engagement portion 105a of the spool shaft 105.

The fishline wound on the spool 103 is released therefrom and wound up thereon through a level wind device 160 provided parallel to the spool shaft 105. The level wind device 160 has a gear 161 in mesh with the drive gear 120, and a line guide portion 162 is slidingly moved right and left by rotating the handle 107 so that the fishline can be wound uniformly on the spool 103.

The spool 103, mounted on the spool shaft 105, has an outer peripheral surface 103a of a cylindrical shape defining a fishline-winding barrel portion, and flanges 103b formed respectively at opposite ends of this cylindrical outer peripheral surface. The fishline is uniformly wound by the level wind device 160 on a groove-like portion defined by the cylindrical outer peripheral surface 103a (which defines the fishline-winding barrel portion) and the two flanges 103b.

Here, if the outer diameter of the flanges 103b is represented by D, and the diameter of the cylindrical outer peripheral surface 103a is represented by d, the spool 103 is so formed that (d/D) is 50~80%. If the double bearing-type reel is designed for casting purposes, D is usually not more than 50 mm. (d/D) is set to be not less than 50% because the spool has a deep groove-configuration if this value is less than 50% with the result that the amount of dead fishline wound on the spool increases. Namely, if the amount of dead fishline increases, a moment of inertia exerted on the spool increases by an amount corresponding to the weight of the dead fishline, so that portion of the fishline to be released bites into the dead fishline, thereby adversely affecting the fishline-releasing ability. If (d/D) is more than 80%, it is possible that the amount (for example, 50~70 m) of the fishline normally released in view of the safety in normal use, for example, in the spool for casting purposes, is not satisfied.

When D is not more than 50 mm, and (d/D) is 50~80%, the amount of winding of the fishline on the spool varies depending on the width of the spool in the direction of the axis thereof; however, the amount of the fishline normally released, even in view of the safety margin is satisfied. In view of the most commonly-used size of the casting reel, it is preferred that D be not more than 40 mm and that d be in the range of 20~30 mm.

In the thus designed spool, the amount of winding of the fishline is smaller as compared with the conventional spools, and that portion (dead fishline) of the fishline, which has not heretofore been used, is eliminated from the spool of the invention, so that the weight of the spool having the fishline wound thereon can be reduced. The cylindrical outer peripheral surface 103a of the spool 103 is larger than that of the conventional construction, and therefore the weight is heavier; however, this can be overcome by forming the spool from a material more lightweight than the material heretofore used.

In order that the weight of the spool 103 will not be heavy, it is preferred that the spool 103 is formed into a hollow cylindrical configuration, and that the spool be fixedly mounted on the spool shaft 105 at its central portion intermediate its opposite ends. In the spool of the illustrated embodiment, a cavity 103c is formed between the fishline-winding barrel portion and the spool shaft 105, and a disk-shaped connection portion 103d is formed at the central portion of the fishline-winding barrel portion, and connected to the spool shaft 105. With this construction, the lightweight design of the spool is achieved. Therefore, the spool of this embodiment is open at its opposite ends. The spool of a hollow cylindrical shape is reinforced by the disk-shaped connection portion 103d. Of course, as similarly to the former embodiment, rib-like portions may be formed in the cavity between the fishline-winding barrel portion and the spool shaft 105 to interconnect them, thereby reinforcing the spool.

In this embodiment, in order that the bearing 104b can be disposed within the cavity 103c in the spool 103, that portion of the frame 101b supporting the bearing extends axially towards the spool. The bearing 104b is thus disposed within the cavity, so that the size of the reel body 101 can be reduced in the direction of the width.

The above construction achieves the following advantageous effects.

Since the spool is formed into the shallow groove-configuration, unnecessary dead fishline is eliminated, and therefore the spool 103 having the fishline wound thereon is reduced in weight, thereby reducing the moment of inertia.

Since the number of the layers of winding of the fishline is reduced, the fishline normally released bites the layer of the fishline to a smaller degree. And besides, when the spool is shifted into the free condition by switching the clutch mechanism, the inner periphery of the pinion 112 is not in contact with the outer periphery of the spool shaft 105, so that the spool shaft 105 is not subjected to a rotational resistance due to friction. Therefore, the fishline-releasing ability is enhanced, and the casting distance is increased, and the casting control is enhanced.

Since the number of the layers of winding of the fishline is smaller, the condition of winding of the fishline in the axial direction is good, so that a rotational balance of the spool is good, thereby suppressing noises (casting noises) produced when the spool 103 rotates at high speed so as to release the fishline.

Since the moment of inertia exerted on the spool 103 having the fishline wound thereon is reduced, the size of the magnets of the magnetic braking device for preventing a backlash phenomenon due to an excessive rotation of the spool can be reduced, and also the number of the magnets can be reduced. In the case of using the centrifugal braking device, the size of the brake collars can be reduced, and also the number of the brake collars can be reduced. As a result, the overall weight of the reel is reduced, and therefore the fishing operability is enhanced, and the cost can be reduced.

Figure 14A:
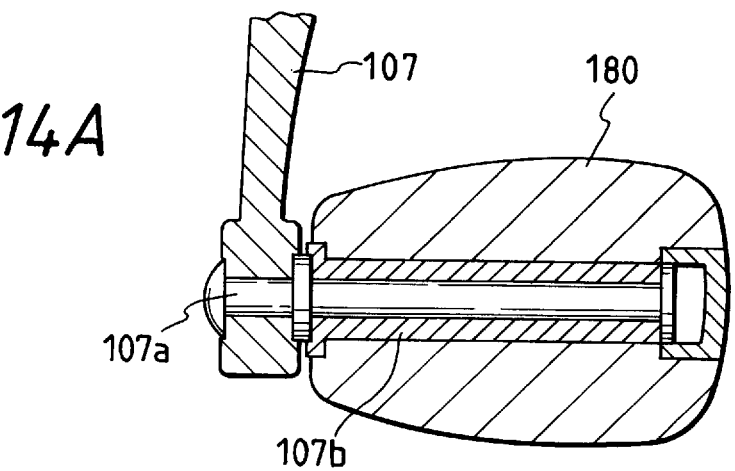
FIGS. 14A to 14C are cross-sectional views respectively showing knobs mounted on a handle of the double bearing-type reel of FIG. 11.
Figure 14B:
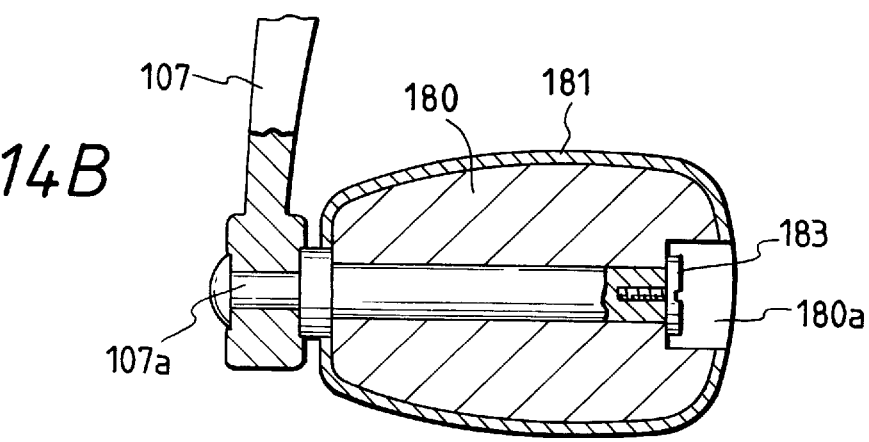
Figure 14C:
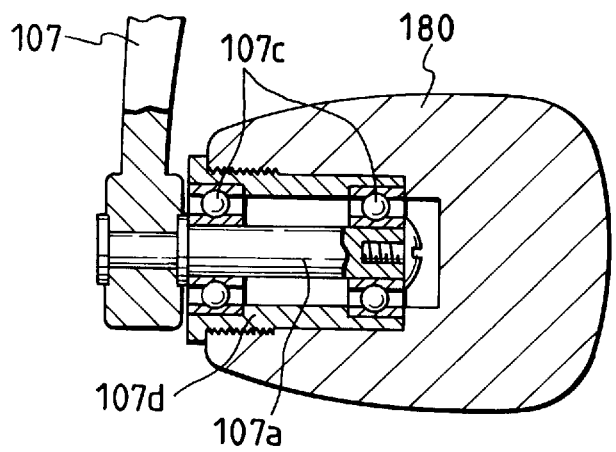

Any one of the handle knobs shown respectively in FIGS. 14A to 14C may be attached to the handle of the above double bearing-type reel. A conventional handle knob is made of a synthetic resin or wood, whereby the touch of the conventional handle knob, obtained when gripping it so as to effect the wind-up operation, is not good. Also, a rotational balance of the handle is not good because of the heavy weight. Therefore, in this embodiment, the handle knob is formed of a cork material 180 having a configuration shown in FIG. 14A, and is mounted on a shaft 107a, mounted on an outer end of the handle 107, through a collar 107b against disengagement therefrom. By thus forming the handle knob of the cork material, a good touch can be obtained when gripping the handle knob, so that a slip is less liable to occur, and the wind-up efficiency is enhanced. And besides, the handle knob is lightweight, so that the rotational balance of the handle is enhanced.

In the handle knob shown in FIG. 14B, a cork material 180 is coated with a resin 181 over an entire surface thereof. This coating is formed, for example, by bonding a resin film, or by molding the resin material on the cork material. This handle knob is rotatably mounted on a shaft 107a, and a screw 183 is threaded into an end face of the shaft 107a through a hole 180a formed in an outer end of the knob, thereby preventing the knob from being disengaged from the shaft 107a. The cork material 180 is thus covered with the resin, thereby protecting the surface portion of the cork material.

In the handle knob shown in FIG. 14C, a cylindrical, box-like member 107d is rotatably mounted on a shaft 107a through ball bearings 107c against disengagement therefrom, and the handle knob is threadedly connected to the box-like member 107d. The handle knob formed of a cork material 180 is merely threadedly connected to the box-like member 107d, and thus can be easily attached thereto, and also the handle knob can be easily exchanged. The cork material may be covered with a resin over an entire surface thereof as in FIG. 14B.

Figure 15:
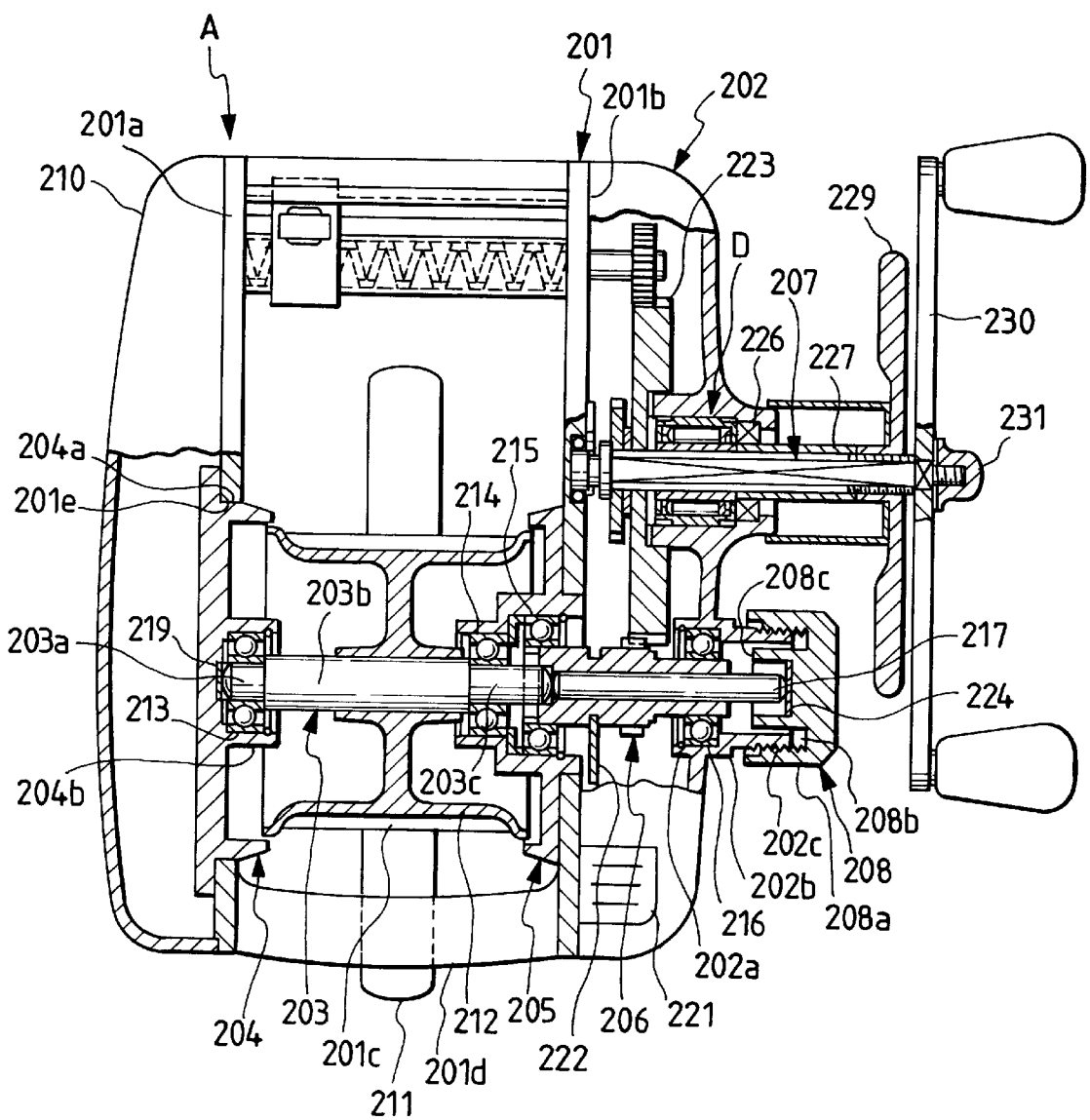
FIG. 15 is a partly-broken, plan view of a third embodiment of a double bearing-type fishing reel.
Figure 16:
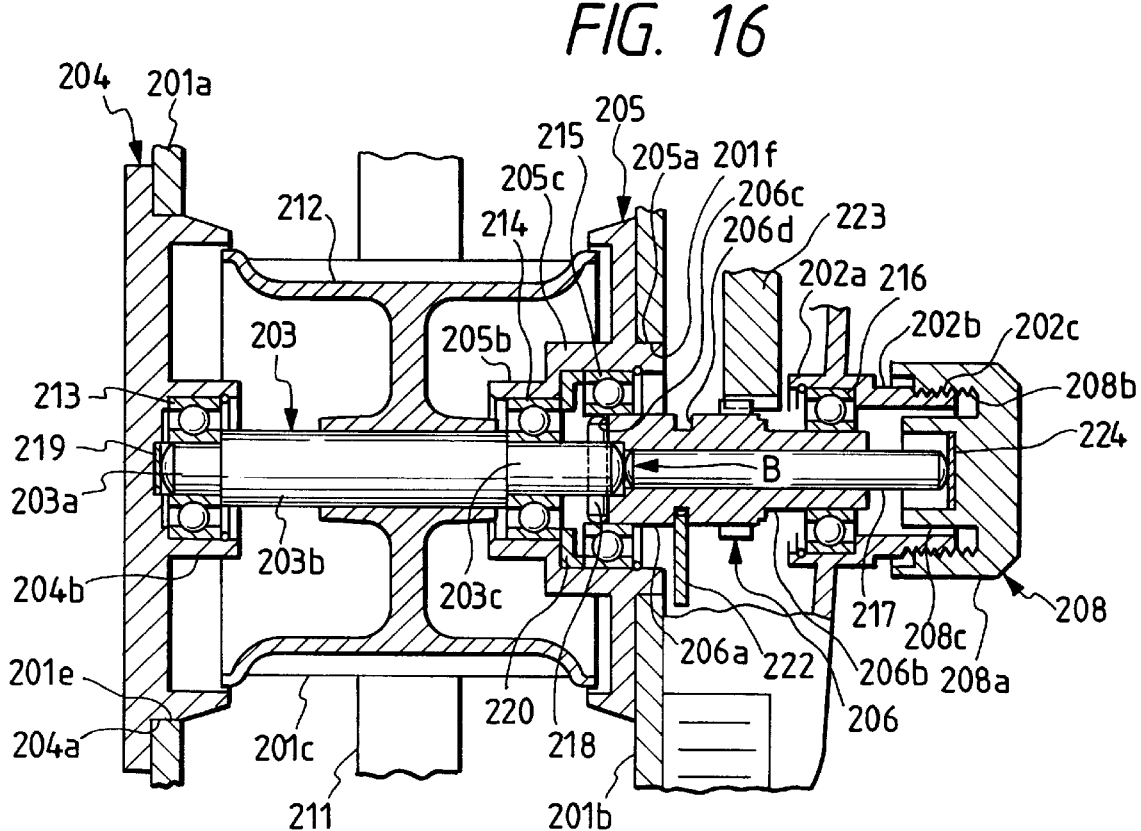
FIG. 16 is an enlarged, horizontal cross-sectional view showing a spool and a clutch mechanism in the third embodiment.
Figure 17:
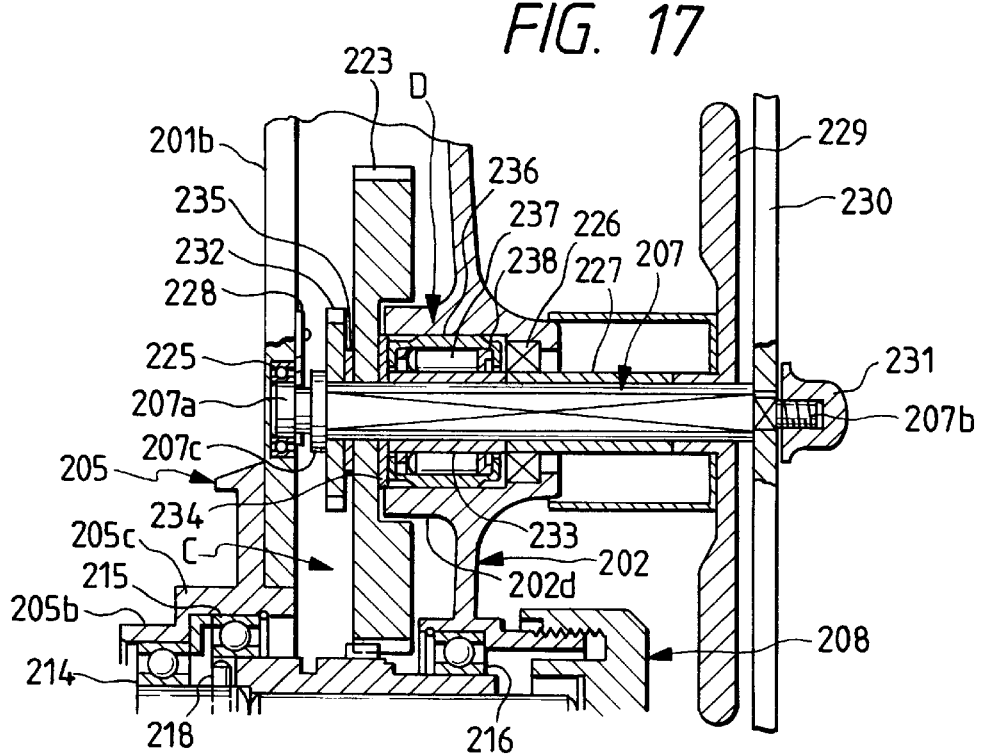
FIG. 17 is an enlarged, horizontal cross-sectional view showing a drive mechanism in the third embodiment.
Figure 18:
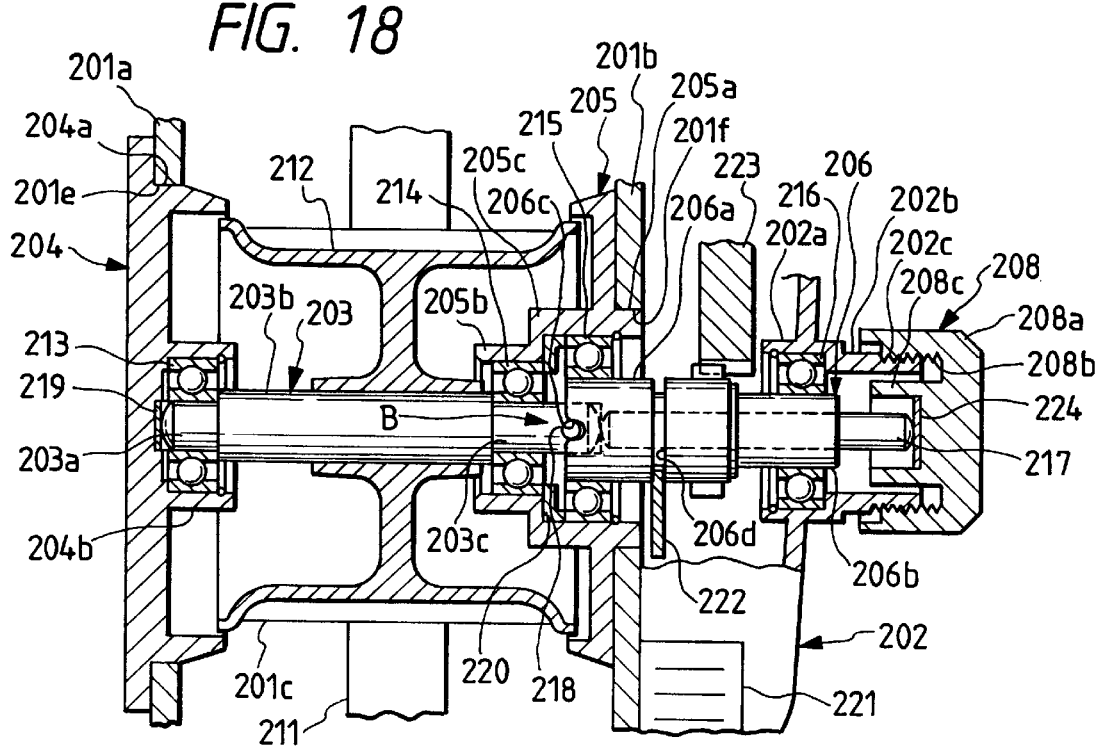
FIG. 18 is an enlarged, horizontal cross-sectional view showing the clutch mechanism when a spool shaft is rotated through 90 degrees.
Figure 19:
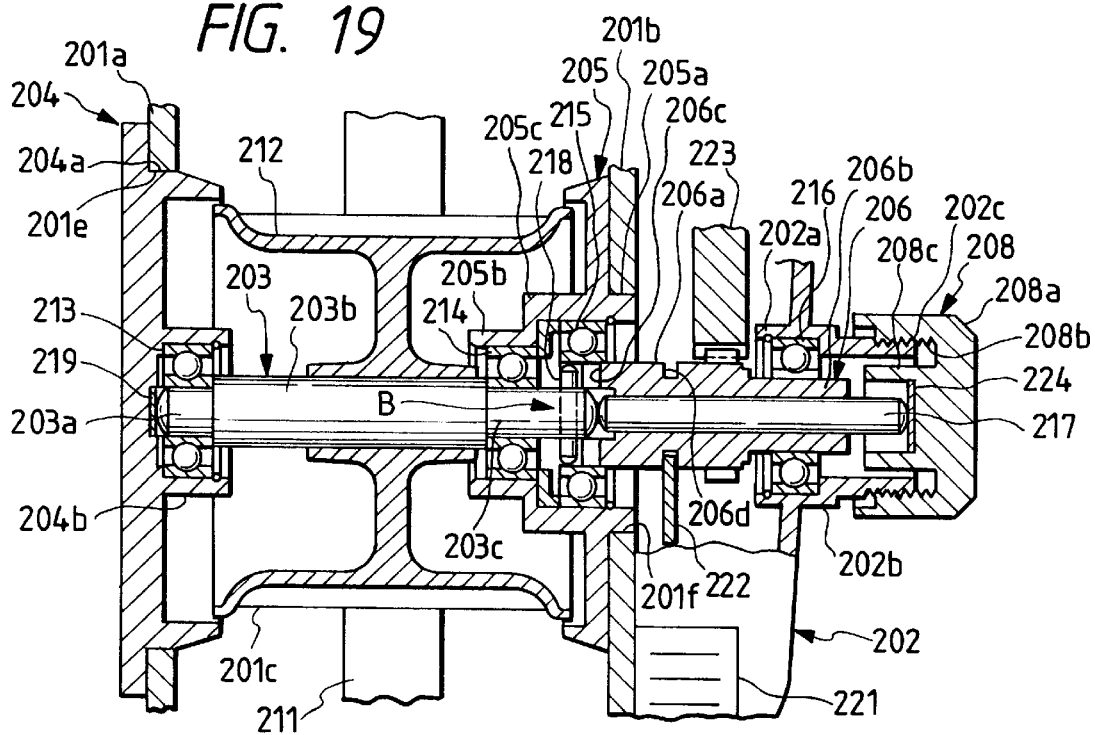
FIG. 19 is an enlarged, horizontal cross-sectional view showing the clutch mechanism in a spool-free condition.
Figure 20:
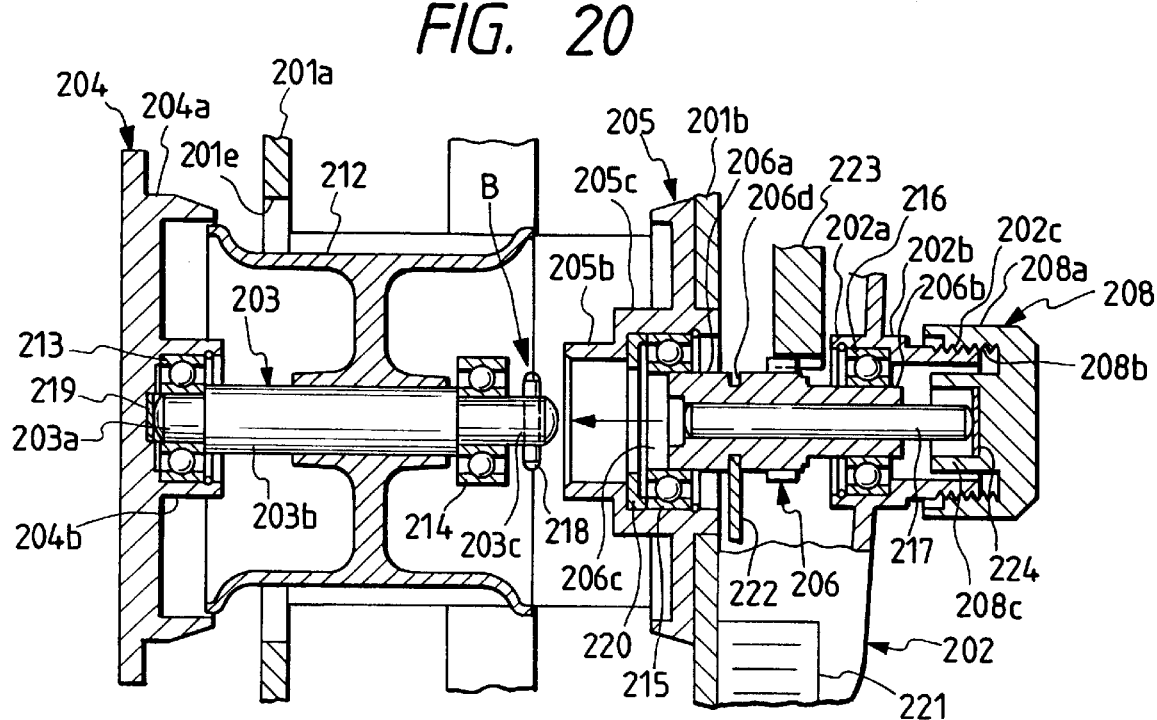
FIG. 20 is an enlarged, horizontal cross-sectional view showing the clutch mechanism in a condition in which the spool is withdrawn from a reel body.

FIG. 15 is a, plan view, partly in section of a double bearing-type fishing reel equipped with another featured clutch mechanism according to the invention, FIG. 16 is an enlarged, horizontal cross-sectional view showing the clutch mechanism, FIG. 17 is an enlarged, horizontal cross-sectional view showing a drive mechanism, FIG. 18 is an enlarged, horizontal cross-sectional view showing the clutch mechanism when a spool shaft is rotated through 90 degrees, FIG. 19 is an enlarged, horizontal cross-sectional view showing the clutch mechanism in a spool-free condition, and FIG. 20 is an enlarged, horizontal cross-sectional view showing the clutch mechanism in a condition in which the spool is withdrawn from a reel body.

The reel body A comprises a frame 201, and left and right side plates 210 and 202 mounted respectively on left and right side frames 201a and 201b of the frame 201.

The frame 201 comprises the left and right side frames 201a and 201b, a support post (not shown), a fixing plate 201c for a reel leg 211, and a finger rest lever 201d which are integrally formed with one another, the left and right side frames 201a and 201b being disposed parallel to each other.

The spool 212 is rotatably supported between the opposite side frames 201a and 201b, and the spool shaft 203 on which the spool 212 is fixedly mounted is rotatably supported by a bearing 213, mounted on a spool cover 204 mounted on the side frame 201a, and a bearing 214 mounted on a spool cover 205 mounted on the side frame 201b.

A bearing 215 is mounted on the spool cover 205, and is disposed on the right side of the bearing 214, and a support portion (bearing) 216 is mounted on the right side plate 202. A larger-diameter tubular portion 206a of a pinion 206 is supported by the bearing 215, and a smaller-diameter tubular portion 206b of the pinion 206 is supported by the support portion (bearing) 216, so that the pinion 206 is supported for rotation and axial sliding movement.

A press lever 217 is fitted in a central bore in the pinion 206 for movement in the axial direction.

The spool shaft 203 includes a smaller-diameter portion 203a supported by the bearing 213, a larger-diameter portion 203b on which the spool 212 is fixedly mounted, and an outwardly-extending end portion 203c of a smaller diameter which projects toward the pinion 206, and is supported by the bearing 214. One end of the press lever 217 is abutted against an end face of the outwardly-extending end portion 203c.

An engagement projection 218 (which constitutes part of the clutch mechanism B) in the form of a pin is fixedly secured to the outwardly-extending end portion 203c of a smaller diameter.

The outer periphery of a cover portion 204a of the spool cover 204 is removably fitted in a through hole 201e in the side frame 201a, and the spool cover 204 is fastened to the outer side of the side frame 201a by screws (not shown).

A tubular portion 204b is formed on the inner side of the spool cover 204 at a central portion thereof, and a thrust bearing 219 and the bearing 213 are mounted in the tubular portion 204b.

A tubular portion 205a is formed on the outer side of the spool cover 205, and is fixedly fitted in a through hole 201f in the side frame 201b.

A stepped tubular portion, consisting of two tubular portions 205b and 205c, is formed integrally on the inner side of the spool cover 205.

The bearing 214 is removably mounted in the tubular portion 205b, and a tubular spacer 220 and the bearing 215 are retainingly mounted in the tubular portion 205c disposed on the right side of the tubular portion 205b.

An engagement recess 206c of a U-shape, which constitutes part of the clutch mechanism B, is formed in an end face of the larger-diameter tubular portion 206a of the pinion 206, and a peripheral groove 206d is formed in the outer peripheral surface of this tubular portion 206a.

The engagement projection 218 of the spool shaft 203 is engaged with and disengaged from the engagement recess 206c in the pinion 206 through an operating plate 222 which is operated by a clutch-operating lever 221, the operating plate 222 being engaged in the peripheral groove 206d.

A drive gear 223, mounted on a drive shaft 207, is in mesh with the pinion 206, thereby constituting the drive mechanism C.

A tubular portion 202a is formed on and projects from the inner side of the right side plate 202, and the support portion (bearing) 216 is mounted in this tubular portion 202a. A tubular portion 202b is formed on and projects from the outer side of the right side plate 202, and a threaded portion 202c is formed on an outer peripheral surface of this tubular portion 202b.

An adjustment thumbscrew 208 is rotatably mounted on the outer periphery of the tubular portion 202b.

The adjustment thumbscrew 208 includes a tubular portion 208a having one closed end, a threaded portion 208b formed on an inner peripheral surface of the tubular portion 208a, and an inner tubular portion 208c.

The other end of the press lever 217 is abutted against a thrust bearing 224 provided in the inner tubular portion 208c.

The drive shaft 207 is supported by a bearing 225, mounted on the right side frame 201b, and is also supported by a metal bearing portion 226, mounted on the side plate 202, through a collar 227. A flange 207a is formed on one end portion of the drive shaft 207 adjacent to the bearing 225, and is retained by a retaining plate 228, thereby preventing withdrawal of the drive shaft 207.

The collar 227 is fitted on the drive shaft 207 against rotation.

A drag adjustment thumbpiece 229 is threaded on the outer periphery of the drive shaft 207, and is disposed outwardly of the metal bearing portion 226. A tubular portion of the drag adjustment thumbpiece 229 is abutted against the collar 227, and a handle 230 is fixedly secured to the other end 207b of the drive shaft 207 by a nut 231.

A clutch reverse rotation gear 232 is fitted on the drive shaft 207 against rotation, and is held against a flange 207c of the drive shaft 207. A friction plate 234, the drive gear 223 and a friction plate 235 are mounted on the drive shaft 207, and are interposed between the clutch reverse rotation gear 232 and an inner ring 233 of a rolling-type one-way clutch D.

Reference is made to the construction by which the clutch is shifted from the clutch OFF-state (in which the engagement projection 218 of the spool shaft 203 is disengaged from the engagement recess 6c in the pinion 206) to the clutch ON-state (in which the engagement projection 218 is engaged with the engagement recess 206c). When the handle 230 is rotated in a direction of winding of a fishline (not shown) on the spool 212, the operating plate 222 is moved from a disengaged position to an engaged position by the clutch reverse rotation gear 232, so that the engagement projection 218 is engaged with the engagement recess 206c.

A cylindrical support portion 202d (which defines a recess) projects from the side plate 202, and is disposed inwardly of the metal bearing portion 226. An outer ring 236 of the rolling-type one-way clutch D is fitted in this cylindrical support portion 202d against rotation.

The rolling-type one-way clutch D comprises the inner ring 233, a plurality of rod-like roller members 237 provided on the outer periphery of the inner ring 233, the outer ring 236, a holder member 238 of a synthetic resin, and a spring (not shown). Thanks to the provision of this clutch D, the handle 230 can be rotated in the direction of winding of the fishline (not shown) on the spool 212, but can not be rotated in a reverse direction.

Referring to the operation of the double bearing-type fishing reel, in the clutch ON-state (in which the engagement projection 218 of the spool shaft 203 is engaged with the engagement recess 206c in the pinion 206), when the handle 230 is rotated in the direction of winding of the fishline (not shown) on the spool 212, the drive shaft 207, the inner ring 233, the drive gear 223, the pinion 206, the spool shaft 203 and the spool 212 are rotated in their normal direction.

When the adjustment thumbscrew 208 is rotated so as to apply a braking force to the rotation of the spool 212, a pressing force is applied in an adjusted manner to the end face of the outwardly-extending end portion 203c of the spool shaft 203 through the press lever 217.

Referring to the reverse rotation prevention operation of the double bearing-type fishing reel, when the fishline (not shown) is pulled by caught fish, and is released from the spool 212, the spool 212 is rotated in the reverse direction, so that the drive shaft 207 and the inner ring 233 are rotated in the reverse direction.

When the drive shaft 207 and the inner ring 233 are thus rotated in the reverse direction, the reverse rotation is prevented by the rolling-type one-way clutch D.

By this reverse rotation, the spool 212 is rapidly stopped by the rolling-type one-way clutch D.

When the clutch is to be shifted from the clutch ON-state to the clutch OFF-state, the operating plate 222 is operated by the clutch-operating lever 221, so that the pinion 206 is axially moved to disengage the engagement recess 206c from the engagement projection 218 of the spool shaft 203, as shown in FIG. 19.

That portion of the pinion 206 having the engagement recess 206c is supported by the bearing 215, thereby maintaining the strength thereof. In addition the pinion 206 is not fitted on the spool shaft 203, and the pinion 206 is supported by the bearing 215 and the support portion (bearing) 216 independently of the spool shaft 203, and therefore a frictional resistance is not exerted, so that the spool shaft 203 and the pinion 206 are smoothly rotated independently of each other in the spool-free condition.

One end of the spool shaft 203 and one end of the pinion 206 are supported respectively by the bearings 214 and 215 which are mounted respectively in the tubular portions 205b and 205c formed integrally with each other. Therefore, the degree of alignment is enhanced, and the engagement projection 218 of the spool shaft 203 is smoothly engaged with and disengaged from the engagement recess 206c in the pinion 206, and the precision of meshing between the pinion 206 and the drive gear 223 is enhanced.

For removing the spool 212 for exchange purposes or others, the spool cover 204, the bearing 213, the spool shaft 203, the spool 212, the bearing 214 and the engagement projection 218 (defined by the pin fixedly secured to the spool shaft 203) are removed, as shown in FIG. 20.

With the above construction of the double bearing-type fishing reel, that portion of the pinion 206 having the engagement recess 206c is supported by the bearing 215, thereby maintaining the strength thereof. The pinion 206 is not fitted on the spool shaft 203, and the pinion 206 is supported by the bearing 215 and the support portion 216 independently of the spool shaft 203. Therefore, a frictional resistance is not exerted, and the spool shaft 203 and the pinion 206 can be smoothly rotated independently of each other in the spool-free condition. Therefore, the casting distance is increased, and the ability of spool-free rotation is enhanced, so that the ability of releasing the fishline is enhanced.

One end of the spool shaft 203 and one end of the pinion 206 are supported respectively by the bearings 214 and 215 mounted respectively in the tubular portions 205b and 205c formed integrally with each other, and therefore the degree of alignment is enhanced. The clutch mechanism B, constituted by the engagement projection 218 of the spool shaft 203 and the engagement recess 206c in the pinion 206, can be smoothly engaged and disengaged, so that the clutch properly functions in a stable manner. Also, the precision of meshing between the pinion 206 and the drive gear 223 is enhanced, so that the rotation for winding purposes can be effected with a small force.

Therefore, the strength, the clutch ON-OFF switching ability, and the ability of releasing the fishline in the OFF-state, which are indispensable to the clutch function, are all enhanced.

Figure 21:
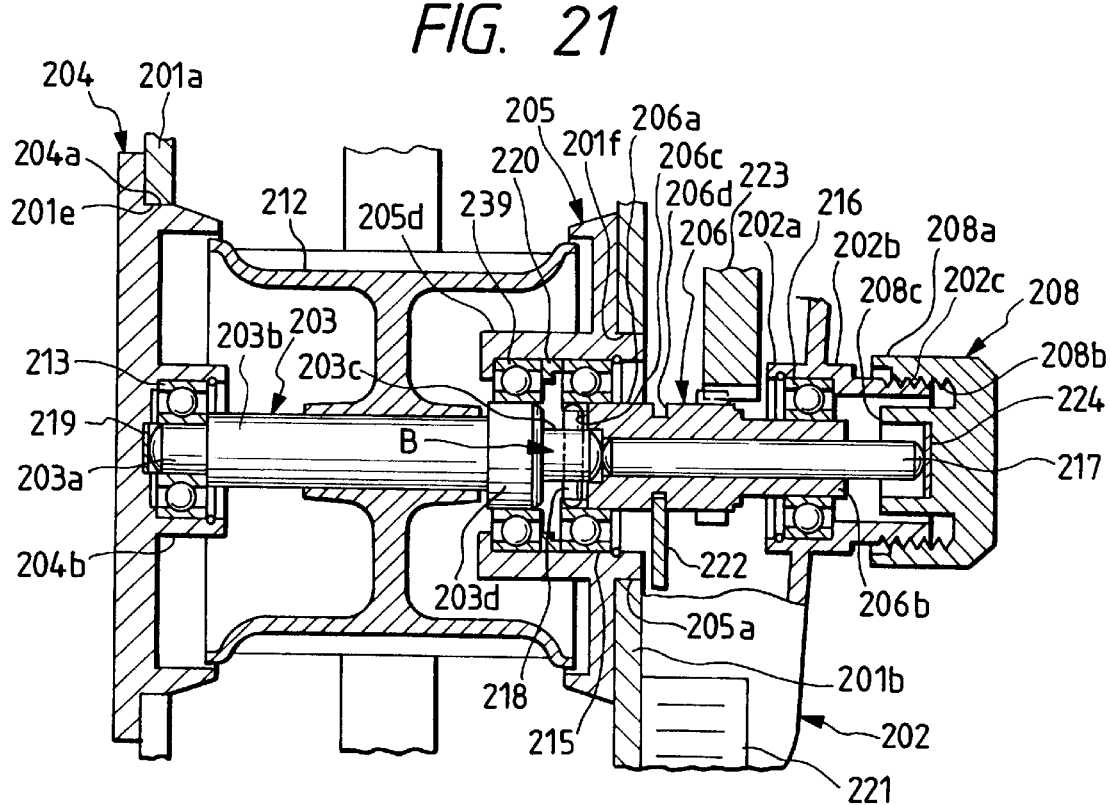
FIG. 21 is an enlarged, horizontal cross-sectional view of a fourth embodiment, showing a spool and a clutch mechanism.
Figure 22:
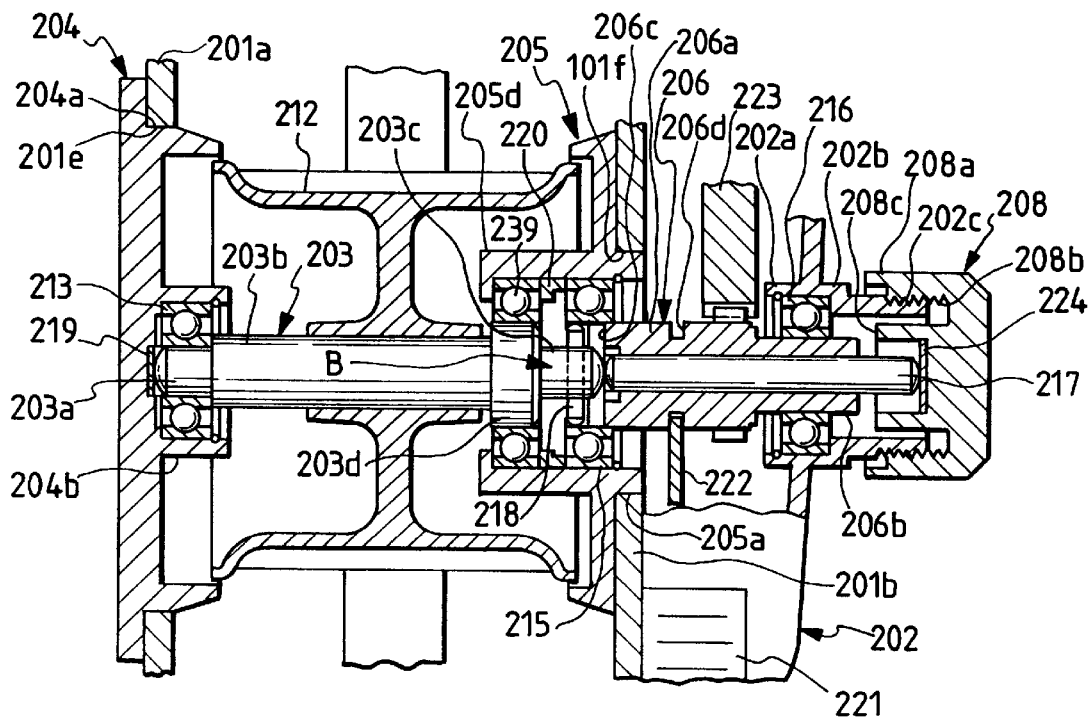
FIG. 22 is an enlarged, horizontal cross-sectional view showing the clutch mechanism in a spool-free condition.
Figure 23:
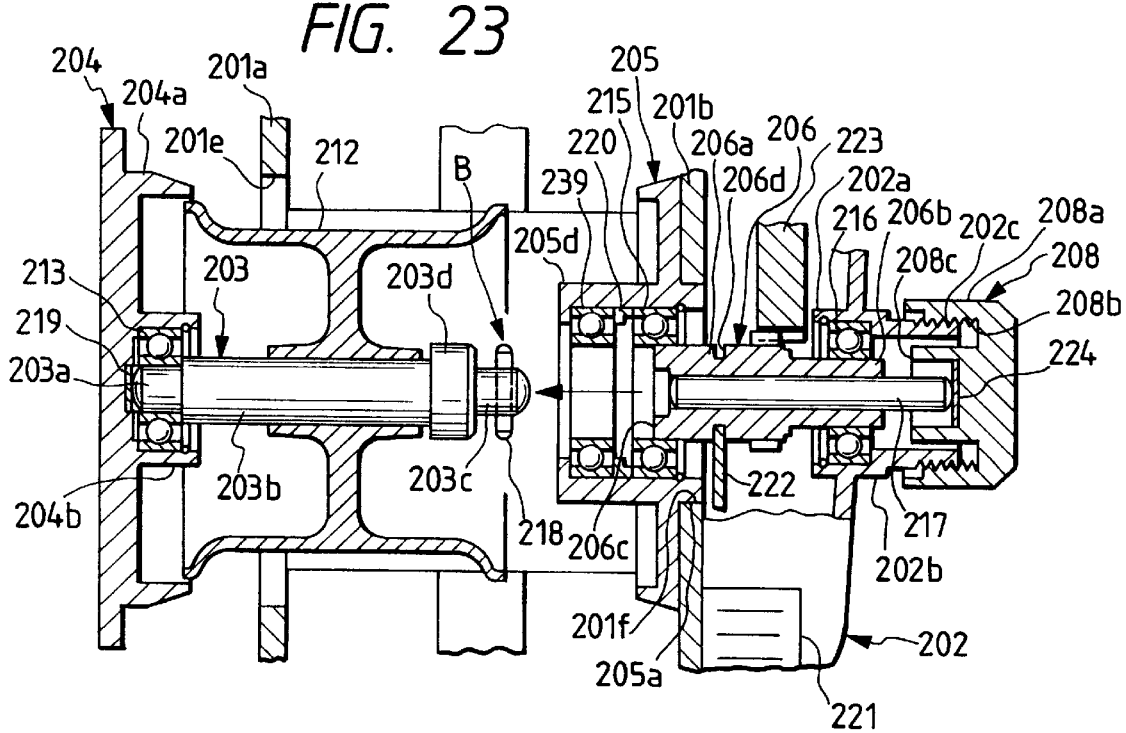
FIG. 23 is a enlarged, horizontal cross-sectional view showing the clutch mechanism in a condition in which the spool is withdrawn from a reel body.

FIGS. 21 to 23 show another embodiment of the invention, and FIG. 21 is an enlarged, horizontal cross-sectional view showing a spool and a clutch mechanism, FIG. 22 is an enlarged, horizontal cross-sectional view showing the clutch mechanism in a spool-free condition, and FIG. 23 is a enlarged, horizontal cross-sectional view showing the clutch mechanism in a condition in which the spool is withdrawn from a reel body.

In this embodiment, a spool shaft 203 includes a smaller-diameter portion 203a supported by a bearing 213, a larger-diameter portion 203b on which the spool 212 is fixedly mounted, a larger-diameter portion 203d supported by a bearing 239, and an outwardly-extending end portion 203c of a smaller diameter which projects toward a pinion 206. One end of a press lever 217 is abutted against an end face of the outwardly-extending end portion 203c.

An engagement projection 218 (which constitutes part of the clutch mechanism B) in the form of a pin is fixedly secured to the outwardly-extending end portion 203c of a smaller diameter.

A tubular portion 205d is formed integrally on an inner side of a spool cover 205.

The bearing 239 is received in the tubular portion 205d, and a tubular spacer 220 and a bearing 215 are retainingly mounted in the tubular portion 205d on the right side of the bearing 239.

The other construction is generally the same as described in the embodiment shown in FIGS. 15 to 20.

In the present embodiment, when the clutch is to be shifted from the clutch ON-state to the clutch OFF-state, an operating plate 222 is operated by a clutch-operating lever 221, so that the pinion 206 is axially moved to disengage an engagement recess 206c thereof from the engagement projection 218 of the spool shaft 203, as shown in FIG. 22.

That portion of the pinion 206 having the engagement recess 206c is supported by the bearing 215, thereby maintaining the strength thereof. The pinion 206 is not fitted on the spool shaft 203, but rather pinion 206 is supported by the bearing 215 and a support portion 216 independently of the spool shaft 203, and therefore a frictional resistance is not exerted. As a result, the spool shaft 203 and the pinion 206 are smoothly rotated independently of each other in a spool-free condition.

One end of the spool shaft 203 and one end of the pinion 206 are supported respectively by the bearings 239 and 215 mounted in the tubular portion 205d, and therefore the degree of alignment is enhanced, so that the engagement projection 218 of the spool shaft 203 is smoothly engaged with and disengaged from the engagement recess 206c in the pinion 206. As a result the precision of meshing between the pinion 206 and a drive gear 223 is enhanced.

To remove the spool 212 for exchange purposes or others, a spool cover 204, the bearing 213, the spool shaft 203, the spool 212, the larger-diameter portion 203d of the spool shaft 203, and the engagement projection 218 (which is defined by a pin) fixedly secured to the spool shaft 203 are removed as shown in FIG. 23.

Figure 24:
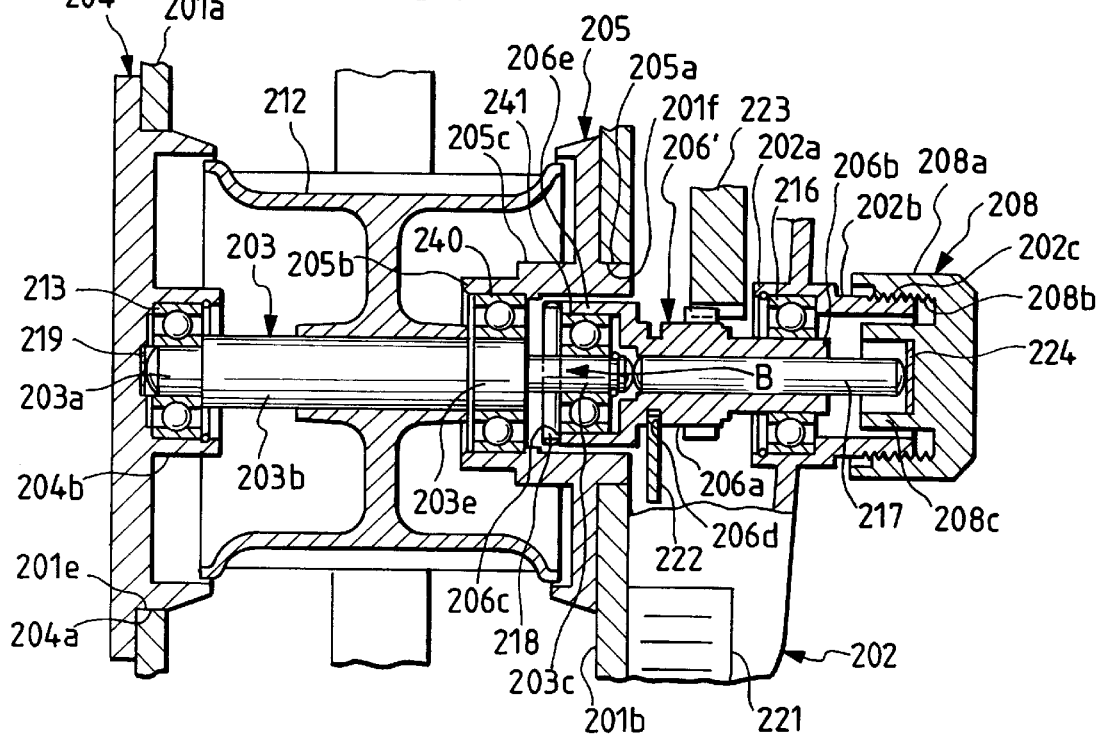
FIG. 24 is an enlarged, horizontal cross-sectional view of a fifth embodiment, showing a spool and a clutch mechanism.
Figure 25:
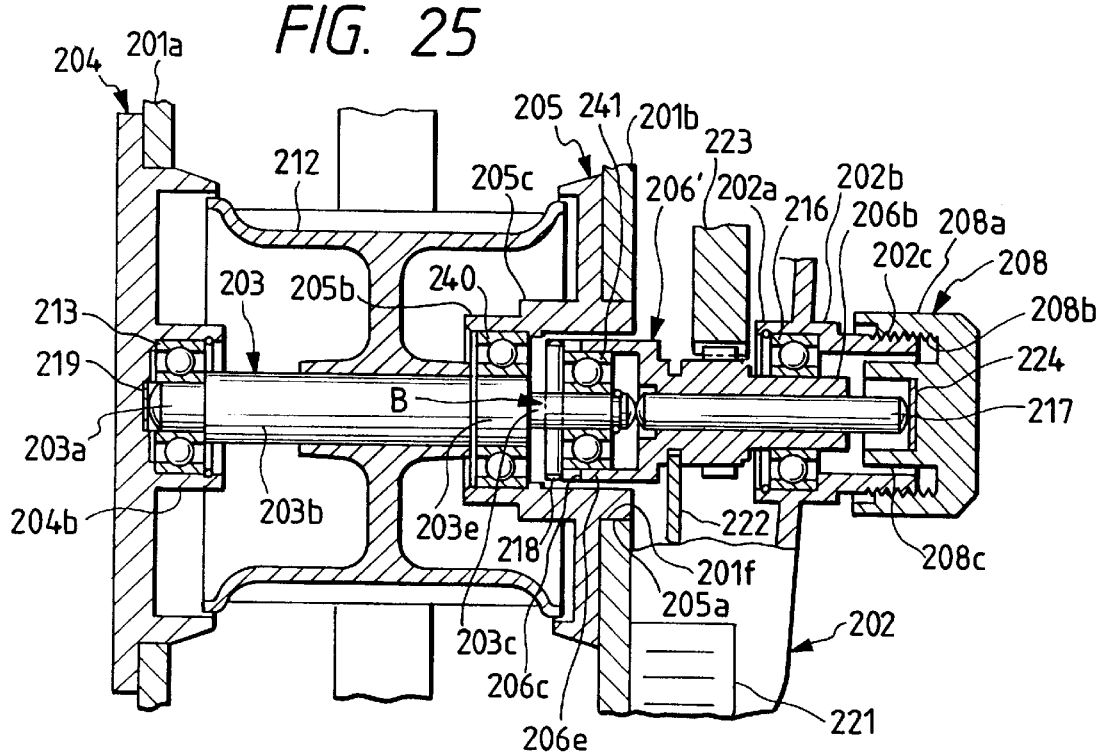
FIG. 25 is an enlarged, horizontal cross-sectional view showing the clutch mechanism in a spool-free condition.

FIGS. 24 and 25 show yet another embodiment of the invention, and FIG. 24 is an enlarged, horizontal cross-sectional view showing a spool and a clutch mechanism, and FIG. 25 is an enlarged, horizontal cross-sectional view showing the clutch mechanism in a spool-free condition.

In this embodiment, a spool shaft 203 includes a smaller-diameter portion 203a supported by a bearing 213, a larger-diameter portion 203b on which the spool 212 is fixedly mounted, a larger-diameter portion 203e supported by a bearing 240, and an outwardly-extending end portion 203c of a smaller diameter which projects toward a pinion 206'. One end of a press lever 217 is abutted against an end face of the outwardly-extending end portion 203c.

An engagement projection 218 (which constitutes part of the clutch mechanism B) in the form of a pin is fixedly secured to the outwardly-extending end portion 203c of a smaller diameter, and a bearing 241 is retainingly fitted on the outwardly-extending end portion 203c.

The engagement projection 218 is sufficiently long to extend radially outwardly of the bearing 241.

A stepped tubular portion, consisting of two tubular portions 205b and 205c, is formed integrally on an inner side of a spool cover 205.

The bearing 240 is removably fitted in the tubular portion 205b.

The pinion 206' has a larger-diameter tubular portion 206e at one end, and the bearing 241 is removably fitted in the tubular portion 206e. A smaller-diameter tubular portion 206b of the pinion 206' is supported by a support portion (bearing) 216 for rotation and axial movement.

The press lever 217 is received in a central bore of the pinion 206' for movement along an axis thereof.

An engagement recess 206c of a U-shape, which constitutes part of the clutch mechanism B, is formed in a distal end of the larger-diameter tubular portion 206e of the pinion 206', and a peripheral groove 206d is formed in an outer peripheral surface of a tubular portion 206a.

The bearing 241 may be mounted in the tubular portion 206e, and the smaller-diameter outwardly-extending end portion 203c of the spool shaft 203 may be removably fitted in the bearing 241.

The other construction is generally the same as in the embodiment shown in FIGS. 15 to 20.

In the present embodiment, when the clutch is to be shifted from the clutch ON-state to the clutch OFF-state, an operating plate 222 is operated by a clutch-operating lever 221, so that the pinion 206' is axially moved to disengage the engagement recess 206c thereof from the engagement projection 218 of the spool shaft 203, as shown in FIG. 25.

That portion of the pinion 206' having the engagement recess 206c is supported by the bearing 241 fitted on the spool shaft 203, thereby maintaining the strength thereof. The pinion 206' is fitted on the spool shaft 203 through the bearing 241, and therefore less frictional resistance develops between the pinion 206' and the spool shaft 203, so that the spool shaft 203 and the pinion 206' are smoothly rotated independently of each other in a spool-free condition.

One end of the spool shaft 203 and one end of the pinion 206' are fitted together through the bearing 241, and therefore the degree of alignment is enhanced, so that the engagement projection 218 of the spool shaft 203 is smoothly engaged with and disengaged from the engagement recess 206c in the pinion 206'. As a result the precision of meshing between the pinion 206' and a drive gear 223 is enhanced.

To remove the spool 212 for exchange purposes or others, a spool cover 204, the bearing 213, the spool shaft 203, the spool 212, the bearing 240, and the engagement projection 218 (which is defined by a pin) fixedly secured to the spool shaft 203 are removed.

In the case where the bearing is mounted in the tubular portion 206e, the bearing 241 remains in the tubular portion 206e.

Figure 26:
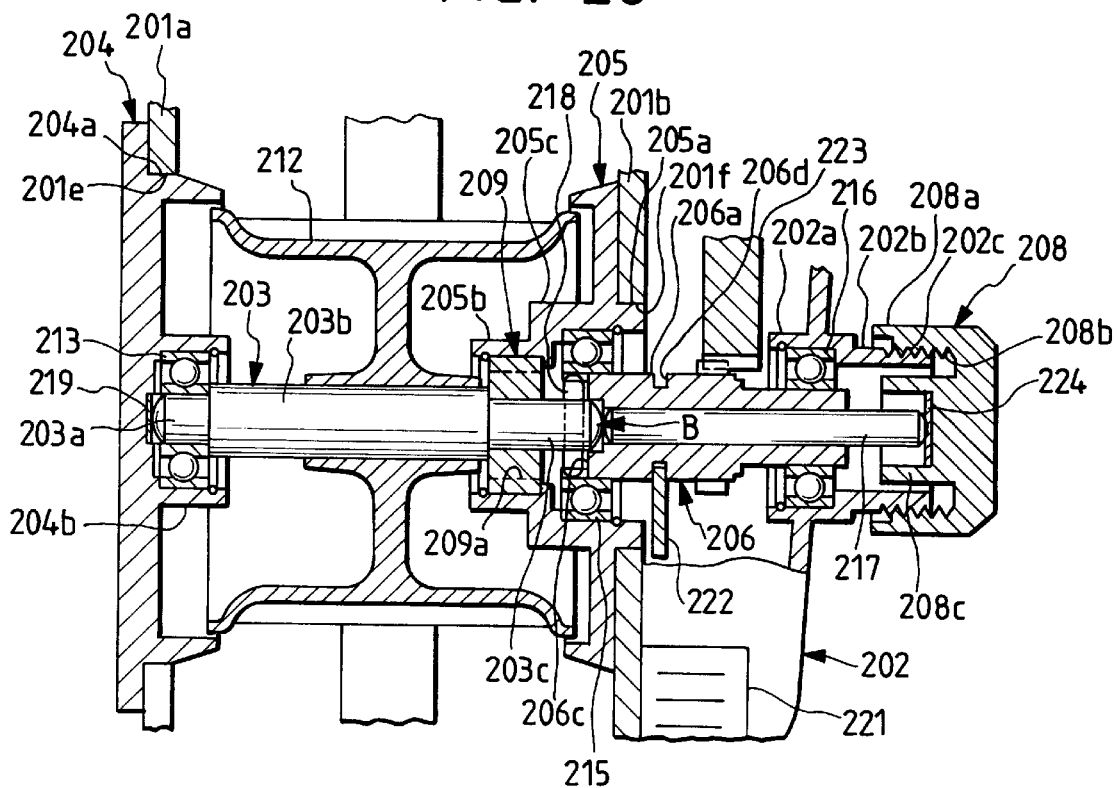
FIG. 26 is an enlarged, horizontal cross-sectional view of a sixth embodiment, showing a spool and a clutch mechanism.
Figure 27:
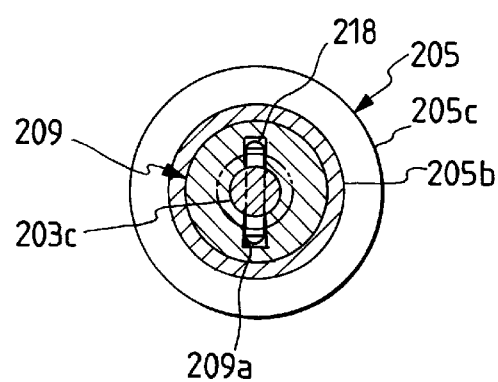
FIG. 27 is a cross-sectional view showing the clutch mechanism.

FIGS. 26 and 27 show yet another embodiment of the invention, and FIG. 26 is an enlarged, horizontal cross-sectional view showing a spool and a clutch mechanism, and FIG. 27 is a cross-sectional view showing the clutch mechanism.

In the present embodiment, a spool shaft 203 includes a smaller-diameter portion 203a supported by a bearing 213, a larger-diameter portion 203b on which the spool 212 is fixedly mounted, and an outwardly-extending end portion 203c of a smaller diameter which is supported by a metal bearing 209, and projects toward a pinion 206. One end of a press lever 217 is abutted against an end face of the outwardly-extending end portion 203c.

An engagement projection 218 (which constitutes part of the clutch mechanism B) in the form of a pin is fixedly secured to the outwardly-extending end portion 203c of a smaller diameter.

A stepped tubular portion, consisting of two tubular portions 205b and 205c, is formed integrally on an inner side of a spool cover 205.

The metal bearing 209 is retainingly fitted in the tubular portion 205b.

A bearing 215 is retainingly fitted in the tubular portion 205c.

The metal bearing 209 has a recess 209a through which the engagement projection 218 can pass.

The other construction is generally the same as in the embodiment shown in FIGS. 15 to 20.

In the present embodiment, the clutch is shifted from the clutch ON-state to the clutch OFF-state generally in the same manner as in the embodiment shown in FIGS. 15 to 20.

For removing the spool 212 for exchange purposes or others, a spool cover 204, the bearing 213, the spool shaft 203, the spool 212, and the engagement projection 218 (which is defined by a pin) fixedly secured to the spool shaft 203 are removed.

When the engagement projection 218 is to be removed, the engagement projection 218 is brought into registry with the recess 209a in the metal bearing 209, and then the removal is effected.

In the foregoing description, although the rolling-type one-way clutch D is provided around the drive shaft 207, the use of this clutch D may be omitted.

In the foregoing description, although the left and right side frames 201a and 201b of the frame 201, the fixing plate 201c and the finger rest plate 201d are formed integrally with one another, these may be separate from one another, in which case the opposite side frames 201a and 201b are held parallel to each other.

What is claimed is:

1. A double bearing type fishing reel comprising:
   a reel body having a pair of opposite side plates;
   a spool having a fishline-winding barrel portion and a pair of flanges, and rotatably mounted between said opposite side plates, said fishline-winding barrel portion having a minimum outer diameter (d) and at least one of said flanges having a maximum outer diameter (D); and
   a clutch mechanism for switching said spool between a fishline-winding condition and a fishline-releasing condition; wherein:
   said outer diameter (D) of said one of said flanges is not more than 50 mm; and
   a ratio (d/D) of said outer diameter (d) of said fishline-winding barrel portion relative to said outer diameter (D) of said one of said flanges is 50~80%.

2. A fishing reel according to claim 1, wherein a pair of cavities are formed in respective opposite ends of said spool, and each extends into said fishline-winding barrel portion.

3. A fishing reel according to claim 2, wherein at least one of said cavities is defined by said fishline-winding barrel portion, a spool shaft mounting portion fixed to a spool shaft, and a connection portion connecting said fishline-winding barrel portion to said spool shaft mounting portion.

4. A fishing reel according to claim 3, wherein said connection portion is formed into a plurality of ribs defining a through hole through which said pair of cavities are communicated with each other.

5. A fishing reel according to claim 1, further comprising:
   a brake device for braking said spool to prevent backlash of a fishline due to excessive rotation of said spool.

6. A fishing reel according to claim 5, wherein a cavity is formed in each of opposite ends of said spool, and extends into said fishline-winding barrel portion.

7. A fishing reel according to claim 6, wherein said brake device is of a centrifugal type which includes:
   a support shaft extending radially from a spool shaft by which said spool is rotatably supported on said side plates;
   a brake collar slidably supported on said support shaft and movable radially with respect to said spool shaft; and
   a brake ring provided in one of said side plates so as to face said brake collar, and adapted to be brought into sliding contact with said brake collar to brake the excessive rotation of said spool.

8. A fishing reel according to claim 6, wherein said brake device is of a magnetic type which comprises:
   an electrically-conductive ring provided for rotation along with said spool; and at least one magnet facing said conductive ring for braking the excessive rotation of said spool in cooperation with said conductive ring.

9. A fishing reel according to claim 1, wherein:
said outer diameter (D) of said one of said flanges is set not more than 40 mm and
said outer diameter (d) of said fishline winding barrel portion is set 20~30 mm.

10. A fishing reel according to claim 9, further comprising:
a magnetic type brake device including:
an electrically-conductive ring provided for rotation along with said spool; and
at least one magnet facing said conductive ring for braking an excessive rotation of said spool in cooperation with said conductive ring.

11. A fishing reel according to claim 10, wherein a pair of cavities are formed in respective opposite ends of said spool, and each extends into said fishline-winding barrel portion.

12. A fishing reel according to claim 9, further comprising:
a centrifugal type brake device including:
a support shaft extending radially from a spool shaft by which said spool is rotatably supported on said side plates;
a brake collar slidably supported on said support shaft and movable radially with respect to said spool shaft; and
a brake ring provided in one of said side plates so as to face said brake collar, and adapted to be brought into sliding contact with said brake collar to brake an excessive rotation of said spool.

13. A fishing reel according to claim 12, wherein a pair of cavities are formed in respective opposite ends of said spool, and each extends into said fishline-winding barrel portion.

14. A fishing reel according to claim 1, wherein said clutch mechanism includes:
an engagement portion formed on one end portion of a spool shaft to which said spool is fixed;
a pinion meshing with a drive gear and movable into and out of engagement with said engagement portion; and
a support member supporting said pinion so that said pinion is rotatable independently of said spool shaft and is axially movable into and out of engagement with said engagement portion.

15. A fishing reel according to claim 14, wherein said support member includes a pair of support bearings supporting respective axial end portions of said pinion.

16. A fishing reel according to claim 15, wherein said spool shaft is rotatably supported on said reel body through a pair of second support bearings different from said first bearings.

17. A fishing reel according to claim 14, wherein said pinion is not in contact with said spool shaft when said pinion is out of engagement with said engagement portion.

18. A fishing reel according to claim 14, wherein said pinion is supported by a shaft separated from said spool shaft.

19. A fishing reel according to claim 14, wherein said spool has a hollow cylindrical configuration.

20. A fishing reel according to claim 19, wherein a cavity is formed between said fishline-winding barrel portion and said spool shaft, and a connection portion is formed at an axially central portion of said fishline-winding barrel portion, and is connected to said spool shaft.

21. A fishing reel according to claim 20, wherein a support bearing, rotatably supporting said spool shaft relative to said reel body, is located within said cavity.

22. A fishing reel according to claim 14, further comprising:
a backlash prevention device for preventing excessive rotation of said spool.

23. A fishing reel according to claim 14, wherein said engagement portion includes a projection radially outwardly extending from said spool shaft.

24. A double bearing type fishing reel comprising:
a reel body having a pair of opposite side plates;
a spool shaft having a spool and a first engagement portion;
a pair of first support bearings disposed on respective end portions of said spool shaft for rotatably supporting said spool with respect to said reel body through said opposite side plates;
a clutch mechanism disconnectably coupling said spool shaft to a drive gear rotatable through rotation of a handle, said clutch mechanism including:
a pinion meshing with said drive gear, said pinion being formed with a second engagement portion engageable with and disengageable from said first engagement portion by an axial motion of said pinion; and
a pair of second support bearings disposed on respective end portions of said pinion for rotatably and axially movably supporting said pinion with respect to said reel body, one second support bearing of said pair of second support bearings being located radially outward from the first engagement portion, said one support bearing of said pair of second support bearings rotationally supporting the pinion against a radial load placed on the pinion.

25. A fishing reel according to claim 24, wherein said second engagement portion is inserted into a space defined radially between said first engagement portion and one support bearing of said pair of second support bearings when said pinion is moved axially to engage said first engagement portion with said second engagement portion.

26. A fishing reel according to claim 24, wherein said spool has a fishline-winding barrel portion and a pair of flanges, said fishline-winding barrel portion has a minimum outer diameter (d) and at least one of said flanges has a maximum outer diameter (D), and a ratio (d/D) of said fishline-winding barrel portion relative to said outer diameter of said one of said flanges is 50~80%.

27. A fishing reel according to claim 26, wherein said outer diameter (D) of one of said flanges is not more than 50 mm.

28. A fishing reel according to claim 24, wherein said first engagement portion protrudes radially from said spool shaft.

29. A double bearing type fishing reel comprising:
a reel body having a pair of opposite side plates;
a spool shaft having a spool and a first engagement portion;
a pair of first support bearings disposed on respective end portions of said spool shaft for rotatably supporting said spool with respect to said reel body through said opposite side plates;
a clutch mechanism disconnectably coupling said spool shaft to a drive gear rotatable through rotation of a handle, said clutch mechanism including:
a pinion meshing with said drive gear, said pinion being formed with a second engagement portion engageable with and disengageable from said first engagement portion by an axial motion of said pinion; and
a second pair of support bearings disposed on respective end portions of said pinion for rotatably and axially movably supporting said pinion with respect to said reel body;

wherein one of said first support bearings and one of said second support bearings, being disposed adjacent to said one of said first support bearings, are supported by a single integral cylindrical portion of said side plate.

30. A fishing reel according to claim 29, wherein said integral cylindrical portion includes a small inner diameter portion and a large inner diameter portion coaxial with respect to each other.

31. A double bearing type fishing reel comprising:

a spool, having a fishline-winding barrel portion and a pair of flanges, rotably mounted between opposite side plates of a reel body; and a clutch mechanism for switching said spool between a fishline-winding condition and a fishline-releasing condition;

wherein said spool has outer diameter D which is not more than 50 mm, said fishline-winding barrel portion of said spool has a diameter d, and a ratio (d/D) of said diameter d and said outer diameter D is 50~80%; and a brake device for preventing backlash of a fishline due to an excessive of said spool.

32. A double bearing type fishing reel comprising:

a spool rotatably supported between right and left frames of a reel body through a spool shaft, and rotated by rotating a handle; and a clutch mechanism for switching said spool between a fishline-winding condition and a fishline-releasing condition, wherein:

said clutch mechanism includes an engagement portion formed on one side of said spool shaft, a pinion which is in mesh with a drive gear driven by said handle, and is movable into and out of engagement with said engagement portion, and a support member supporting said pinion in such a manner that said pinion is rotatable independently of said spool shaft, and is axially movable into and out of engagement with said engagement portion;

said spool has a cylindrical outer peripheral surface defining a fishline-winding barrel portion, and two flanges formed respectively at opposite ends of said cylindrical outer peripheral surface;

at least one of said flanges has an outer diameter D and said cylindrical outer peripheral surface has an outer diameter d; and a ratio (d/D) of said outer diameter d to said outer diameter D is 50~80%.

33. A double bearing type fishing reel comprising:

a spool shaft, having a spool, which is rotatably supported between opposite side plates of a reel body; and a clutch mechanism in which an engagement recess, formed in a pinion meshingly engaged with a drive gear rotated by operating a handle, is brought into and out of engagement with an engagement projection on said spool shaft, thereby switching said clutch mechanism between a winding condition and a spool-free condition; wherein said spool shaft has an outwardly-extending end portion extending outwardly past a support bearing disposed inside of said side plate on which said handle is provided;

said engagement projection is formed on said outwardly-extending end portion;

said pinion, having said engagement recess for engagement with said engagement projection, is supported by a support portion, mounted in said side plate of said reel body, for rotation and sliding movement and for rotationally supporting said pinion against a radial load placed on said pinion; and said support portion being located radially outward from the engagement projection.

34. A fishing reel according to claim 33, wherein said spool comprises:

a fishline-winding barrel portion having a first diameter d; and at least one flange having a second diameter D, wherein a ratio (d/D) of said first diameter d and said second diameter D is 50~80%.

35. A fishing reel according to claim 34, wherein said second diameter D is no more than 50 mm.

36. A fishing reel according to claim 35, wherein said first diameter d is 20~30 mm and said second diameter D is not more than 40 mm.

37. A fishing reel according to claim 33, wherein said spool shaft comprises a larger diameter portion for supporting said spool and wherein a first diameter of said outwardly-extending end portion is smaller than a second diameter of said larger diameter portion.

* * * * *